United States Patent
Ramasamy et al.

(10) Patent No.: US 11,593,951 B2
(45) Date of Patent: Feb. 28, 2023

(54) MULTI-DEVICE OBJECT TRACKING AND LOCALIZATION

(71) Applicant: QUALCOMM Incorporated, San Diego, CA (US)

(72) Inventors: Bala Ramasamy, San Diego, CA (US); Edwin Chongwoo Park, San Diego, CA (US); Benjamin Lund, Escondido, CA (US); Justin Tse, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 16/801,066

(22) Filed: Feb. 25, 2020

(65) Prior Publication Data
US 2021/0264620 A1    Aug. 26, 2021

(51) Int. Cl.
  *G06T 7/292*   (2017.01)
  *G06T 7/77*    (2017.01)
  *G06T 7/73*    (2017.01)

(52) U.S. Cl.
  CPC .............. *G06T 7/292* (2017.01); *G06T 7/73* (2017.01); *G06T 7/77* (2017.01); *G06T 2207/20081* (2013.01); *G06T 2210/12* (2013.01)

(58) Field of Classification Search
  CPC .. G06T 7/292; G06T 7/73; G06T 7/77; G06T 2207/20081; G06T 2210/12
  See application file for complete search history.

(56) References Cited

U.S. PATENT DOCUMENTS

| | | | | |
|---|---|---|---|---|
| 5,961,571 A * | 10/1999 | Gorr | ................... | G05D 1/0272 340/988 |
| 6,108,591 A * | 8/2000 | Segal | ..................... | G08G 1/127 701/1 |
| 6,707,487 B1 * | 3/2004 | Aman | ................... | G06V 10/245 348/169 |
| 7,450,735 B1 * | 11/2008 | Shah | ....................... | G06T 7/292 348/169 |
| 7,483,049 B2 * | 1/2009 | Aman | ..................... | G06T 7/246 348/162 |
| 8,103,123 B2 * | 1/2012 | Vehvilainen | ........... | H04N 5/217 348/14.02 |
| 8,878,936 B2 * | 11/2014 | Nerayoff | ............ | G06Q 30/0284 348/148 |
| 9,398,231 B2 * | 7/2016 | Yuasa | .............. | G08B 13/19608 |
| 9,495,759 B2 * | 11/2016 | DeMartin | .............. | G06V 20/52 |

(Continued)

*Primary Examiner* — Manav Seth
(74) *Attorney, Agent, or Firm* — Holland & Hart LLP

(57) ABSTRACT

Methods, systems, and devices for multi-device object tracking and localization are described. A device may transmit a request message associated with a target object to a set of devices within a target area. The request message may include an image of the target object, a feature of the target object, or at least a portion of a trained model associated with the target object. Subsequently, the device may receive response messages from the set of devices based on the request message. The response messages may include a portion of a captured image including the target object, location information of the devices, a pose of the devices, or temporal information of the target object detected within the target area by the devices. In some examples, the device may determine positional information with respect to the target object based on the one or more response messages.

19 Claims, 11 Drawing Sheets

(56) References Cited

U.S. PATENT DOCUMENTS

| | | | |
|---|---|---|---|
| 9,648,579 B2* | 5/2017 | Abhishek | G01C 21/3407 |
| 9,665,596 B2* | 5/2017 | Ramanujapuram | G06F 16/583 |
| 10,088,549 B2* | 10/2018 | Nielsen | G01S 5/0263 |
| 10,489,566 B2* | 11/2019 | Seth | G06F 21/316 |
| 10,643,062 B2* | 5/2020 | Polimeno | G06V 40/16 |
| 10,719,759 B2* | 7/2020 | Kutliroff | G06T 7/73 |
| 10,725,631 B2* | 7/2020 | Ernst | G06T 7/292 |
| 10,896,515 B1* | 1/2021 | Siminoff | G08B 3/10 |
| 11,023,727 B2* | 6/2021 | Ding | H04N 5/23299 |
| 11,200,614 B2* | 12/2021 | Short | G06F 3/0488 |
| 11,276,193 B2* | 3/2022 | Hagio | G06T 7/70 |
| 2013/0128050 A1* | 5/2013 | Aghdasi | H04N 7/181 |
| | | | 348/158 |
| 2016/0379074 A1* | 12/2016 | Nielsen | G01S 5/0263 |
| | | | 348/143 |
| 2021/0105409 A1* | 4/2021 | Kouno | G06V 10/44 |
| 2021/0166536 A1* | 6/2021 | Ohtsuji | G08B 13/19613 |
| 2022/0092986 A1* | 3/2022 | Lund | G08G 1/0141 |
| 2022/0245565 A1* | 8/2022 | Moncrief | G16H 40/20 |

* cited by examiner

MULTI-DEVICE OBJECT TRACKING AND LOCALIZATION

BACKGROUND

Some systems, such as computer vision multi-device tracking systems may be deployed to provide various types of information, such as recognition information and tracking information, among other examples. These systems may be implemented by multiple devices (e.g., camera-enabled devices) that may collect and transfer data (e.g., videos, images) to a server to provide the information.

Some computer vision multi-device tracking systems may be susceptible to privacy issues due to the transfer of data from the devices to the server. Additionally, power issues, communication link issues, and/or latency issues may inhibit the transfer of the data to the server. Some computer vision multi-device tracking systems may also operate according to a configuration that configures the devices to detect, track, and recognize a variety of objects (e.g., faces, vehicles). In some cases, the variety of objects the devices may detect or track may be inadequate, or the configuration may be inaccessible to user modification, or both.

SUMMARY

Various aspects of the described techniques relate to configuring a device to support multi-device object tracking and localization. For example, the described techniques may be used to configure the device to tracking a target object according to a combination of images (e.g., images of a target object, images of an object associated with the target object) provided or captured by one or more other devices. In some examples, the described techniques may be used to configure the device to tracking a target object according to a training learning model and applying the models for detecting and tracking the target object. The device may thus experience improvements to accuracy of object detection, tracking, and localization, and may, in some examples, experience reduced latency with the object detection, tracking, and localization.

A method of tracking an object is described. The method may include transmitting a request message associated with a target object to a set of devices within a target area, the request message including one or more of an image of the target object, a feature of the target object, or at least a portion of a trained model associated with the target object. The method may include receiving one or more response messages from one or more devices of the set of devices based on the request message, the one or more response messages including one or more of a portion of an image including the target object captured by the one or more devices, location information of the one or more devices, a pose of the one or more devices, or temporal information of the target object detected within the target area by the one or more devices. In some examples, the method may include determining positional information with respect to the target object based on the one or more response messages, the positional information including one or more of a direction to a location of the target object, a distance to the location of the target object, or a route to the location of the target object.

An apparatus for tracking an object is described. The apparatus may include a processor, memory coupled with the processor, and a transceiver. The processor may transmit, via the transceiver, a request message associated with a target object to a set of devices within a target area, the request message including one or more of an image of the target object, a feature of the target object, or at least a portion of a trained model associated with the target object. The processor may receive, via the transceiver, one or more response messages from one or more devices of the set of devices based on the request message, the one or more response messages including one or more of a portion of an image including the target object captured by the one or more devices, location information of the one or more devices, a pose of the one or more devices, or temporal information of the target object detected within the target area by the one or more devices. In some examples, the processor may determine positional information with respect to the target object based on the one or more response messages, the positional information including one or more of a direction to a location of the target object, a distance to the location of the target object, or a route to the location of the target object.

Another apparatus for tracking an object is described. The apparatus may include means for transmitting a request message associated with a target object to a set of devices within a target area, the request message including one or more of an image of the target object, a feature of the target object, or at least a portion of a trained model associated with the target object. The apparatus may include means for receiving one or more response messages from one or more devices of the set of devices based on the request message, the one or more response messages including one or more of a portion of an image including the target object captured by the one or more devices, location information of the one or more devices, a pose of the one or more devices, or temporal information of the target object detected within the target area by the one or more devices. In some examples, the apparatus may include means for determining positional information with respect to the target object based on the one or more response messages, the positional information including one or more of a direction to a location of the target object, a distance to the location of the target object, or a route to the location of the target object.

A non-transitory computer-readable medium storing code at a device for tracking an object is described. The code may include instructions executable by a processor to transmit a request message associated with a target object to a set of devices within a target area, the request message including one or more of an image of the target object, a feature of the target object, or at least a portion of a trained model associated with the target object, receive one or more response messages from one or more devices of the set of devices based on the request message, the one or more response messages including one or more of a portion of an image including the target object captured by the one or more devices, location information of the one or more devices, a pose of the one or more devices, or temporal information of the target object detected within the target area by the one or more devices, and determine positional information with respect to the target object based on the one or more response messages, the positional information including one or more of a direction to a location of the target object, a distance to the location of the target object, or a route to the location of the target object.

Some examples of the method, apparatuses, and non-transitory computer-readable medium described herein may further include operations, features, means, or instructions for estimating the positional information with respect to the target object based on one or more of the one or more response messages, the estimated positional information including one or more of an estimated direction, an estimated distance, or an estimated route to the location of the target object. In some examples, determining the positional information with respect to the target object may be based on the estimated positional information.

Some examples of the method, apparatuses, and non-transitory computer-readable medium described herein may further include operations, features, means, or instructions for obtaining one or more of the image of the target object, the feature of the target object, or at least the portion of the trained model associated with the target object. In some examples, transmitting the request message associated with the target object to the set of devices within the target area may be based on the obtaining.

Some examples of the method, apparatuses, and non-transitory computer-readable medium described herein may further include operations, features, means, or instructions for receiving a second response message from the one or more devices of the set of devices based on the request message, the second response message including the portion of the image including the target object, verifying the portion of the image including the target object based on the second response message. In some examples, the one or more response messages may be transmitted by the one or more devices of the set of devices based on the verification of the portion of the image including the target object.

Some examples of the method, apparatuses, and non-transitory computer-readable medium described herein may further include operations, features, means, or instructions for identifying a privacy rule associated with the target object, the privacy rule controlling one or more identifiable information of the target object. In some examples, one or more of transmitting the request message or receiving the one or more response messages may be based on the privacy rule associated with the target object.

In some examples of the method, apparatuses, and non-transitory computer-readable medium described herein, each of the one or more response messages include a confidence score associated with one or more of the location information of the one or more devices, the pose of the one or more devices, or the temporal information of the target object.

In some examples of the method, apparatuses, and non-transitory computer-readable medium described herein, each of the one or more response messages include one or more of location information of the target object determined by the one or more devices or a pose of the target object determined by the one or more devices.

Some examples of the method, apparatuses, and non-transitory computer-readable medium described herein may further include operations, features, means, or instructions for transmitting a second request message associated with the target object to the set of devices within the target area, receiving one or more second response messages from the one or more devices of the set of devices based on the second request message, the one or more second response messages including one or more of a portion of a second image including the target object captured by the one or more devices, updated location information of the one or more devices, an updated pose of the one or more devices, or updated temporal information of the target object detected within the target area by the one or more devices, and updating the positional information with respect to the target object based on the one or more second response messages.

Some examples of the method, apparatuses, and non-transitory computer-readable medium described herein may further include operations, features, means, or instructions for estimating the positional information with respect to the target object based on the one or more second response messages. In some examples, determining the positional information with respect to the target object may be based on the estimated positional information.

Some examples of the method, apparatuses, and non-transitory computer-readable medium described herein may further include operations, features, means, or instructions for determining one or more of a previous location of the target object, a temporal instance associated with the previous location of the target object, or a previous direction associated with the target object. In some examples, the request message may include one or more of the previous location of the target object, the temporal instance associated with the previous location of the target object, or the previous direction associated with the target object.

In some examples of the method, apparatuses, and non-transitory computer-readable medium described herein, the temporal information of the target object includes one or more of a temporal period or a temporal instance associated with the one or more devices detecting the target object.

In some examples of the method, apparatuses, and non-transitory computer-readable medium described herein, the portion of the image including the target object includes one or more bounding boxes associated with the target object.

In some examples of the method, apparatuses, and non-transitory computer-readable medium described herein, the image including the target object includes a live image including the target object captured by the one or more devices or a buffered image including the target object and stored by the one or more devices.

In some examples of the method, apparatuses, and non-transitory computer-readable medium described herein, the trained model associated with the target object may include operations, features, means, or instructions for a set of learning layers of the trained model for distinguishing the target object from one or more additional objects in one or more images captured by the one or more devices, and one or more of class information associated with each of the set of learning layers of the trained model, name associated with each of the set of layers of the trained model, or version associated with each of the set of layers of the trained model.

In some examples of the method, apparatuses, and non-transitory computer-readable medium described herein, the portion of the trained model associated with the target object includes a relationship between the target object and at least one additional object with respect to the target object, and one or more of transmitting the request message or receiving the one or more response messages may be based on one or more of the relationship or a weighting factor associated with the relationship.

In some examples of the method, apparatuses, and non-transitory computer-readable medium described herein, the trained model includes a set of learning models, the set of learning models including a set of learning functions associated with one or more of detecting the target object, detecting the feature of the target object, detecting one or more additional objects, detecting features of the one or more additional objects, or differentiating between the target object and the one or more additional objects.

In some examples of the method, apparatuses, and non-transitory computer-readable medium described herein, the one or more response messages may include a first response message based on a first subset of learning models of the set of learning models, and a second response message based on a second subset of learning models of the set of learning models, where the second subset of learning models may be different from the first subset of learning models.

DETAILED DESCRIPTION

Figure 1:
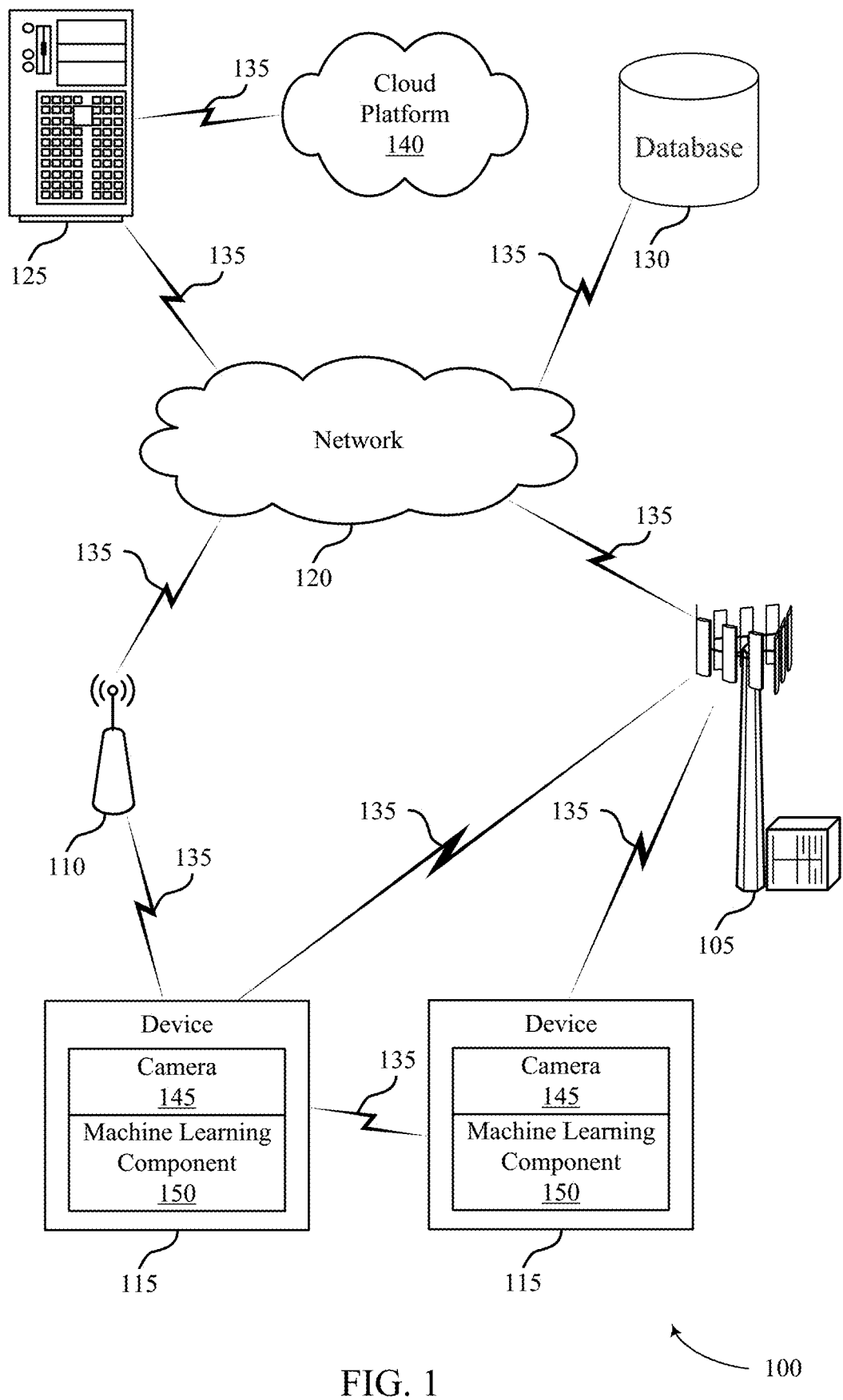
FIG. 1 illustrates an example of a system for object tracking that supports multi-device object tracking and localization in accordance with aspects of the present disclosure.

Various aspects of the described techniques relate to configuring a device to support multi-device object tracking and localization. For example, a device may track a target object (e.g., a child) with assistance of other devices by transmitting a request message associated with the target object to the other devices, which may be within a target area. In some examples, the request message may include an image of the target object. In some other examples, the request message may include one or more features of the target object. In other examples, the request message may include a training model associated with the target object. The training model may include a same or a partially-same beginning learning layer(s) and an ending learning layer(s) to distinguish the target object (e.g., a fully connected (FC) layer).

Subsequent to the transmission of the request message, the device may receive response messages from the other devices. The response messages may include, for example, images of the target object or images of objects associated with the target object, or both, that are captured by the other devices. In some examples, the response messages may include a portion of an image including the target object, a portion of an image including an object associated with the target object, a location of the target object, a location of the other devices, a pose of the target object, a pose of the other devices, or a temporal period of the target object detected within the target area.

The device may determine positional information with respect to the target object based on one or more of the response messages. In some examples, the positional information may include a direction, a distance, or a route to the location of the target object. In some examples, the device may output (e.g., display) a representation of the direction, the distance, the route, or the portion of the image. The device may therefore include features for detecting and tracking a target object based on multi-device object tracking and localization, among other benefits.

Particular aspects of the subject matter described herein may be implemented to realize one or more advantages. The described techniques may support improvements in multi-device object detection, tracking, and localization, among other advantages. As such, supported techniques may include features for providing accurate object detection, tracking, and localization applicable to computer vision-based recognition systems. The described techniques may also support improved reliability and reduced latency, as the improvements may provide for learning model integration as well as continuous refinement in learning model accuracy beneficial to object detection, tracking, and localization. The described techniques may provide improvements over, for example, closed systems which may rely on proprietary hardware for object detection and tracking.

Aspects of the disclosure are initially described in the context of a system that supports multi-device object tracking and localization. Aspects of the disclosure are further illustrated by and described with reference to apparatus diagrams, system diagrams, and flowcharts that relate to multi-device object tracking and localization.

FIG. 1 illustrates an example of a system 100 that supports multi-device object tracking and localization in accordance with aspects of the present disclosure. The system 100 may include a base station 105, an access point 110, devices 115, a server 125, a database 130, and a cloud platform 140. The base station 105, the access point 110, the device 115, the server 125, and the database 130 may communicate with each other via network 120 using communications links 135. In some examples, the system 100 may support improved training and verification of learning models, thereby providing enhancements to object tracking and localization.

The base station 105 may wirelessly communicate with the devices 115 via one or more base station antennas. Base station 105 described herein may include or may be referred to by those skilled in the art as a base transceiver station, a radio base station, a radio transceiver, a NodeB, an eNodeB (eNB), a next-generation Node B or giga-nodeB (either of which may be referred to as a gNB), a Home NodeB, a Home eNodeB, or some other suitable terminology. The device 115 described herein may be able to communicate with various types of base stations and network equipment including macro eNBs, small cell eNBs, gNBs, relay base stations, and the like. The access point 110 may be configured to provide wireless communications for the device 115s over a relatively smaller area compared to the base station 105.

A device 115 may include a camera 145 and a machine learning component 150. The camera 145 may be a standalone camera, a digital camera, a stereo camera, and/or the like that may be integrated with the device 115. In some examples, the camera 145 may be, for example, a closed circuit television (CCTV) camera, a network security camera, an internet protocol (IP) camera, an internet-of-things (IoT) camera that may be in electronic communication with the device 115. In some examples, the device 115 may support multiple cameras 145. The camera 145 may be stationary or mobile. The camera 145 may have one or more sensors for example, such as a charge coupled device (CCD) sensor or a complementary metal-oxide semiconductor (CMOS) sensor. In some examples, the camera 145 may capture a set of images of a target object. In some examples, the camera 145 may capture a set of images of a physical environment (e.g., a multi-dimensional space) having the target object disposed within the environment.

The machine learning component 150 may include a machine learning network (e.g., a neural network, a deep neural network, a cascade neural network, a convolutional neural network, a cascaded convolutional neural network, a trained neural network, etc.). The machine learning network may include or refer to a set of instructions and/or hardware (e.g., modeled loosely after the human brain) designed to recognize patterns. In some examples, the machine learning network may interpret sensory data through a kind of machine perception, labeling or clustering raw input. In some examples, the machine learning component 150 may perform learning-based object recognition processing on content (e.g., multimedia content, such as captured image frames or video frames) to support multi-device object tracking and localization according to the techniques described herein. In some examples, the machine learning component 150 may be implemented in a central processing unit (CPU), or the like, in the device 115. For example, the machine learning component 150 may be implemented by aspects of a processor of the device 115, for example, such as processor 840 described in FIG. 8.

A machine learning network may be a neural network (e.g., a deep neural network) including one or more layers (e.g., neural network layers, convolution layers). In some examples, the machine learning network may receive one or more input signals at an input layer or a first layer and provide output signals via an output layer or a last layer. The machine learning network may process the one or more input signals, for example, utilizing one or more intermediate layers (e.g., one or more intermediate hidden layers). In some examples, each of the layers of the machine learning network may include one or more nodes (e.g., one or more neurons) arranged therein and may provide one or more functions.

The machine learning network may also include connections (e.g., edges, paths) between the one or more nodes included in adjacent layers. Each of the connections may have an associated weight (e.g., a weighting factor, a weighting coefficient). The weights, for example, may be assignable by the machine learning network. In some examples, the device 115 may train and implement the machine learning network at various processing stages to provide improvements related to device (e.g., multi-device) object tracking and localization in accordance with aspects of the present disclosure.

The device 115 may implement the machine learning component 150 for detecting and tracking a target object. In some examples, the device 115 may implement the machine learning component 150 for distinguishing the target object from additional objects in images captured by the devices 115. In some examples, the machine learning component 150 may include training models (e.g., learning models). The device 115 may train the machine learning component 150 (e.g., train the training models), for example, based on captured images and objects included in the captured images. In some examples, bounding boxes in an image captured by the camera 145 may define a target object and multi-dimensional objects associated with the target object.

The target object and the multi-dimensional objects (and the associated bounding boxes) may be used by the device 115 for training learning models included in the machine learning component 150. In some examples, the device 115 and another device 115 may apply the learning models for object tracking and localization of the target object. The techniques described herein for multi-device object tracking and localization using the learning models may support autonomous or semi-autonomous functions related to, for example, computer vision-based recognition and computer vision multi-device tracking systems. Thereby, positional information of a target object with respect to the device 115 in a physical environment may be established with a high-degree of accuracy.

For example, a device 115 may track a target object (e.g., a child, an asset or inventory item) with the assistance of other devices 115. The device 115 may transmit a request message associated with the target object to devices 115 within a target area. In some examples, the device 115 may transmit the request message via the base station 105, the access point 110, the server 125, or any combination thereof. In some examples, the request message may include an image of the target object, features of the target object, or a training model (e.g., a trained model) associated with the target object. The training model may be included in a set of training models included in the machine learning component 150.

The device 115 may receive response messages from the other devices 115. In some examples, the response messages may include images captured by the other devices 115. The response messages may include, for example, a portion of an image including the target object, a portion of an image including an object associated with the target object, or both. In some examples, the response messages may include a location of the target object (e.g., estimated coordinates of the target object, an estimated area) or a pose of the target object (e.g., position, orientation, or both of the target object). In some examples, the response messages may include a pose of the other devices 115 (e.g., position, orientation, or both of a device 115 which detected the target object or captured an image including the target object). In some other aspects, the response messages may include a temporal period of the target object detected within the target area (e.g., a temporal period during which the device 115 detected the target object or captured an image including the target object). The device 115 may determine a direction, a distance, or a route to the location of the target object based on the response messages. In some examples, the device 115 may output (e.g., display) a representation of the direction, the distance, the route, or the portion of the image.

In some examples, the device 115 may be stationary and/or mobile. In some examples, the device 115 may be configured as part of a computer vision multi-device tracking system. The device 115 may, additionally or alternatively, include or be referred to by those skilled in the art as a user equipment (UE), a user device, a cellular phone, a smartphone, a smart device (e.g., smart glasses, augmented reality glasses, a smartwatch), a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the device 115 may also be able to communicate directly with another device 115 (e.g., using a peer-to-peer (P2P) or device-to-device (D2D) protocol).

The device 115 may include memory, a processor, an output, and a communication module. The processor may be a general-purpose processor, a digital signal processor (DSP), an image signal processor (ISP), a CPU, a graphics processing unit (GPU), a microcontroller, an application-specific integrated circuit (ASIC), a field-programmable gate array (FPGA), and/or the like. The processor may be configured to process data (e.g., images, bounding boxes, loss comparison values, calibration information, intrinsic parameter values, extrinsic parameter values,) from and/or write data (e.g., images, bounding boxes, loss comparison values, calibration information, intrinsic parameter values, extrinsic parameter values) to the memory. The processor may also be configured to provide image enhancements, image restoration, image analysis, image compression, and image synthesis. For example, the device 115 may support multi-device object tracking and localization, according to the techniques described herein.

The memory may be, for example, a random-access memory (RAM), a memory buffer, a hard drive, a database, an erasable programmable read-only memory (EPROM), an electrically erasable programmable read only memory (EEPROM), a read-only memory (ROM), a flash memory, a hard disk, a floppy disk, cloud storage, and/or so forth. In some examples, the device 115 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, multi-device object tracking and localization and training learning models.

The network 120 that may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G) for example), etc. Network 120 may include the Internet.

The server 125 may include any combination of a data server, a cloud server, a server associated with an automation service provider, proxy server, mail server, web server, application server, a map server, a road assistance server, database server, communications server, home server, mobile server, or any combination thereof. The server 125 may also transmit to the device 115 a variety of information, such as instructions or commands relevant to multi-device object tracking and localization and training learning models. The database 130 may store data that may include instructions or commands (e.g., images, training models) relevant to multi-device object detection and tracking. The device 115 may retrieve the stored data from the database 130 via the base station 105 and/or the access point 110. The cloud platform 140 may be an example of a public or private cloud network. The device 115 may also be referred to here as a cloud client, which may access the cloud platform 140 over the network 120. In some examples, a cloud client may access the cloud platform 140 to store, manage, and process data associated with a learning model.

The communications links 135 shown in the system 100 may include uplink transmissions from the device 115 to the base station 105, the access point 110, or the server 125, and/or downlink transmissions, from the base station 105, the access point 110, the server 125, and/or the database 130 to the device 115. The downlink transmissions may also be called forward link transmissions while the uplink transmissions may also be called reverse link transmissions. The communications links 135 may transmit bidirectional communications and/or unidirectional communications. Communications links 135 may include one or more connections to 345 MHz, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

Figure 2:
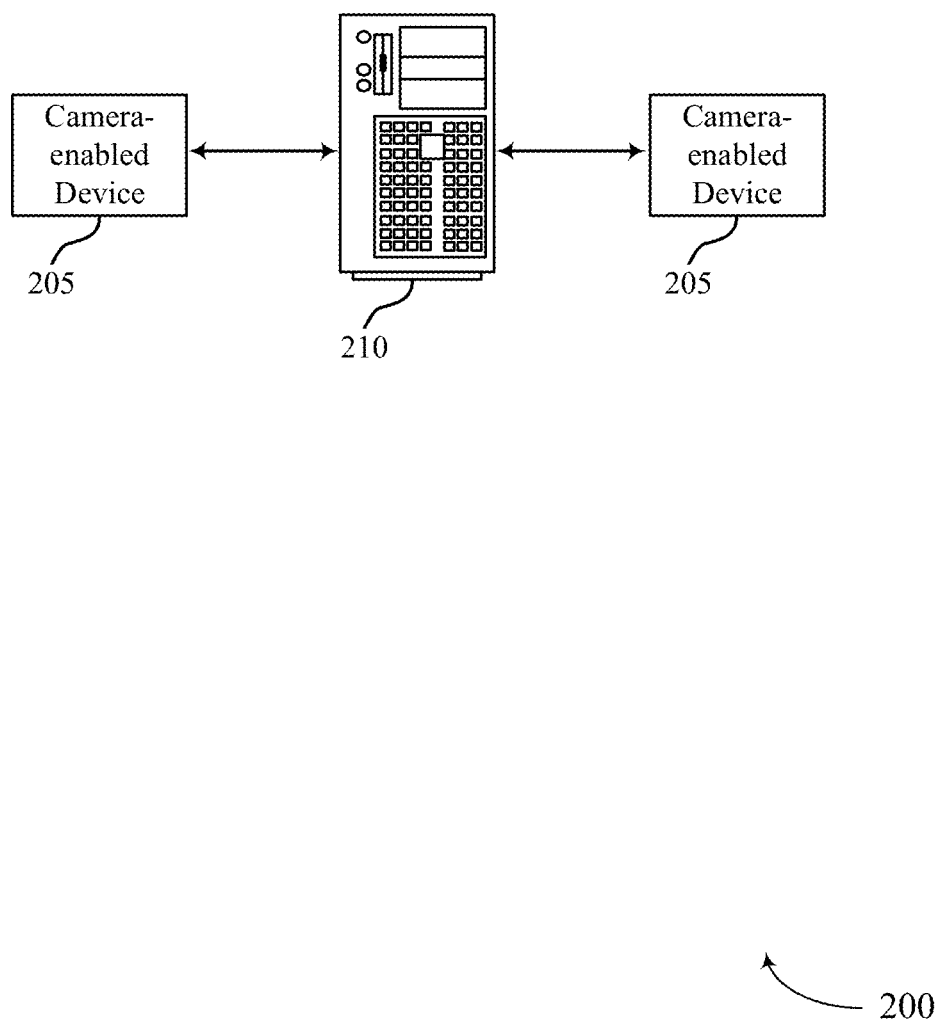
FIG. 2 illustrates an example implementation that supports multi-device object tracking and localization in accordance with aspects of the present disclosure.

FIG. 2 illustrates an example of a system 200 that supports multi-device object tracking and localization in accordance with aspects of the present disclosure. In some examples, the system 200 may implement aspects of the system 100 as described in FIG. 1. For example, the system 200 may be a multi-device tracking system including multiple camera-enabled devices 205 and a server 210, which may be examples of devices described in FIG. 1. The camera-enabled devices 205 may include, for example, a CCTV camera, an IP cameras, or an IoT camera. The server 210 may be a remote server, for example, a cloud server, as described in FIG. 1, respectively. Alternatively, the server 210 may be a local server.

The camera-enabled devices 205 may capture a set of images (e.g., video images). In some examples, the camera-enabled devices 205 may transfer (e.g., via wired or wireless communications) the set of images to the server 210. The server 210 may perform computer vision operations on the images. For example, the server 210 may perform object detection, object tracking, object recognition, etc. on the set of images. In some cases, the camera-enabled devices 205 may attempt to transfer (e.g., transmit, upload) an entirety of each captured image to the server 210.

In some cases, transferring the entirety of each captured image may be associated with privacy issues, for example, due to an amount of information present in the capture images (e.g., facial images). Additionally or alternatively, in some cases, the system 200 may be pre-configured to detect specific objects (e.g., facial recognition, people, vehicles, etc.) without features for modifying criteria associated with object tracking (e.g., based on user preference). The system 200 may also, in some cases, experience power issues (e.g., a power outage), communication link issues (e.g., signal strength, signal interference), or latency issues that may delay the transfer of images from the camera-enabled devices 205 to the server 210 and, as a result, may impede that the computer vision operations on the images.

Figure 3:
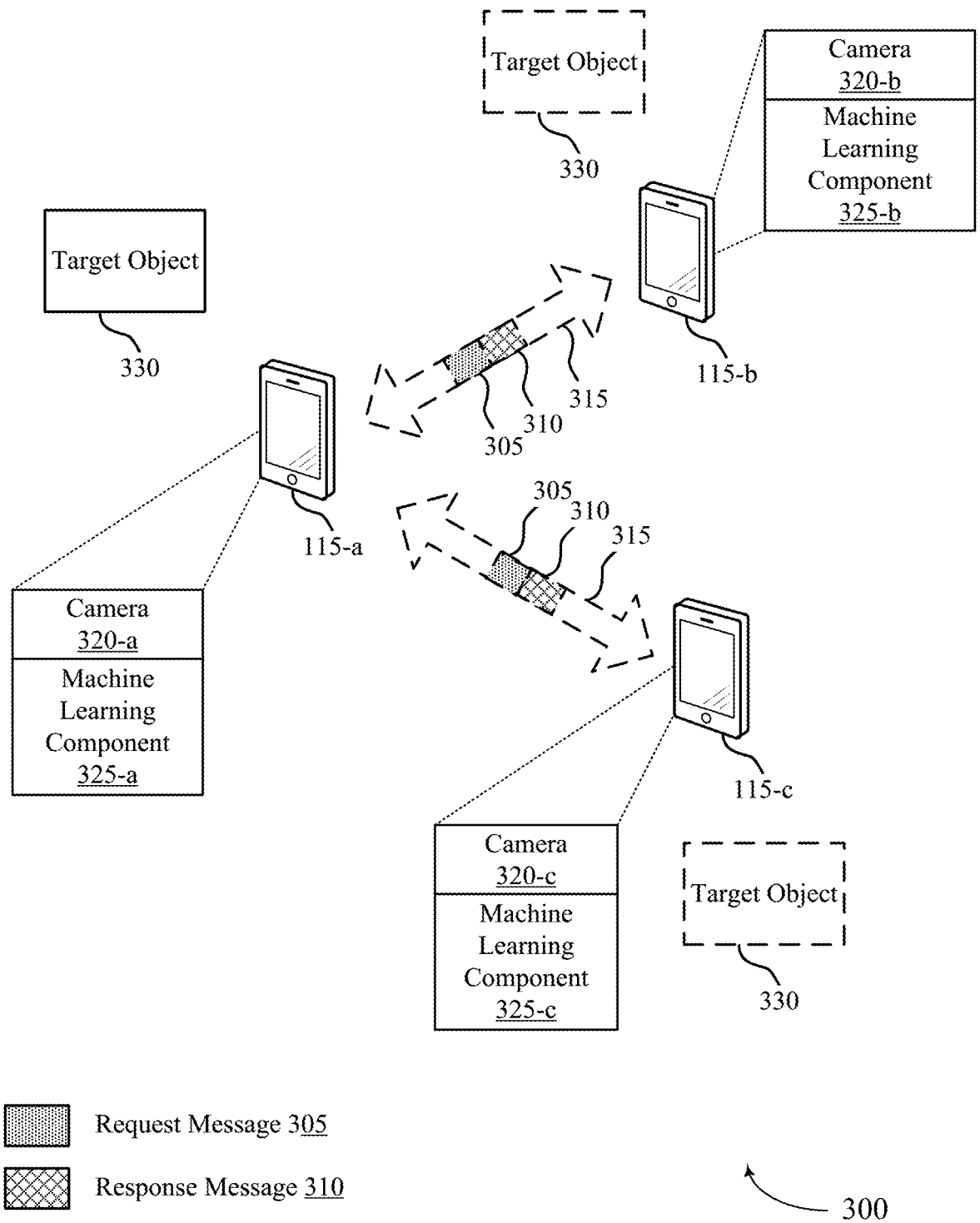
FIG. 3 illustrates an example of a system that supports multi-device object tracking and localization in accordance with aspects of the present disclosure.

FIG. 3 illustrates an example of a system 300 that supports multi-device object tracking and localization in accordance with aspects of the present disclosure. In some examples, the system 300 may implement aspects of systems 100 and 200 described herein. The example system 300 may include devices 115 (e.g., devices 115-a through 115-c). The devices 115-a through 115-c may be examples of aspects of the device 115 as described herein. In some examples, the devices 115 may be stationary or mobile.

The devices 115 (e.g., the devices 115-a through 115-c) may each include a camera 320 and a machine learning component 325. For example, the device 115-a may include a camera 320-a and a machine learning component 325-a, the device 115-b may include a camera 320-b and a machine learning component 325-b, and the device 115-c may include a camera 320-c and a machine learning component 325-c.

The cameras 320 may be examples of aspects of the camera 145 described herein. In some examples, the cameras 320 may be integrated with the devices 115. In some examples, the cameras 320 may be standalone or stationary (e.g., a security camera, an IoT camera, an IP camera, a camera coupled to augmented reality glasses, for example, smart glasses). In some examples, the cameras 320 may include a machine learning component 325. In some examples, the cameras 320 may capture images (e.g., video images) continuously or periodically. In some examples, the cameras 320 may capture images (e.g., video images) based on a user input (e.g., via the device 115, via the camera 320).

The machine learning component 325 may be an example of aspects of the machine learning component 150 described herein. The machine learning component 325 may include a machine learning network (e.g., a neural network, a deep neural network, a cascade neural network, a convolutional neural network, a cascaded convolutional neural network, a trained neural network, etc.). In some examples, the machine learning component 325 may include a set of training models. Examples of aspects of the training models with respect to multi-device object tracking and localization are described herein.

According to examples of aspects described herein, the device 115-a may track a target object 330 (e.g., a child, a lost laptop, an asset or inventory item) with the assistance of other devices 115. In an example, the device 115-a may transmit a request message 305 associated with the target object 330 to the other devices 115 (e.g., the device 115-b, the device 115-c) within a target area (or located within a threshold distance from the threshold area). In some examples, the request message 305 may include a request for location where the target object 330 was last detected by the devices 115 (e.g., the device 115-b, the device 115-c) within the target area. In some examples, the device 115-a may transmit the request message 305 via a communications link 315. The communications link 315 may include examples of aspects of the communications links 135 described herein with respect to FIG. 1.

In some examples, the request message 305 may include an image of the target object 330. In an example, the image of the target object 330 may be an image obtained (e.g., captured) by the device 115-a. The image of the target object 330 may include, for example, a real-time image captured by the device 115-a, an image captured and stored (e.g., buffered) in a memory of the device 115-a, or both. In some examples, the image may include the target object 330 and an object associated with the target object 330. In some examples, the request message 305 may include multiple images (e.g., images of the target object 330, images of the object associated with the target object 330, images including the target object 330 and the object associated with the target object 330).

In some examples, the device 115-a may upload images of the target object 330 to remote server (e.g., the server 125). The remote server may train a training model for the target object 330 and provide the training model back to the device 115-a. The device 115-a may distribute the training model to the other devices 115 (e.g., the device 115-b, the device 115-c) via the request message 305, for example. In some examples, the device 115-a may distribute, via the request message 305, a pointer to the training model stored on the remote server.

In some examples, the device 115-a may upload images of the target object 330, training models (e.g., trained models) associated with the target object 330, or both, to the remote server (e.g., the server 125). The device 115-a may communicate (e.g., periodically communicate) with the remote server to indicate objects the device 115-a may potentially want to find (e.g., a child, keys, a laptop computer), for example, in cases where the objects are lost. The remote server may train the training models for locating the objects, for example, based on the images and communications. In some examples, where one or more of the indicated objects is lost, the device 115-a may notify the remote server of the lost object. The remote server may obtain images from other devices 115 (e.g., the device 115-b, the device 115-c) within a target area associated with the lost object, devices 115 that were in or within a threshold distance of the target area prior to the notification from the device 115-a (or prior to a temporal instance indicated in the notification), or a combination thereof. Based on the obtained images and the training models, for example, the remote server may determine and provide positional information (e.g., a location of the lost object) to the device 115-a.

Alternatively or additionally, the remote server may transmit the request message associated with the lost object to other devices 115 (e.g., the device 115-b, the device 115-c) within a target area associated with the lost object, devices 115 that were in or within a threshold distance of the target area prior to the notification from the device 115-a (or prior to a temporal instance indicated in the notification), or a combination thereof. The request message may include, for example, images of the lost object, features of the lost object, the training model(s) associated with the lost object, or a combination thereof.

In an example where the target object 330 is a child, the object associated with the child may be an article of clothing (e.g., a hat, pants, a jacket) the child was wearing at a temporal instance when the child was previously detected by the device 115-a (e.g., when the device 115-a captured the image of the child). In an example where the target object 330 is a portable device (e.g., a laptop computer, a tablet computer), the object associated with the laptop computer may be an object (e.g., a sticker, for example, a sticker associated with the band "Green Day") attached to the mobile device at a temporal instance when the mobile device was previously detected by the device 115-a (e.g., when the device 115-a captured an image of the mobile device).

In some examples, the request message 305 may include features of the target object 330. The features may include, for example, physical features (e.g., characteristics) of the target object, features associated with motion of the target object 330, or a combination thereof. In some examples, where the target object 330 is a child, the physical features may include, for example, hair color, hair length, height, skin color, skin tone, or the like. In some examples, the features associated with motion may include the child's gait. In some examples, where the target object 330 is a mobile device (e.g., a laptop computer, a tablet computer), the features may include, for example, color, size, device type (e.g., laptop computer, tablet computer).

In some examples, the request message 305 may include a training model (e.g., a trained model) associated with the target object 330. In some examples, the request message 305 may include a portion of the training model. The training model may be included in a set of training models included, for example, in the machine learning component 150. In some examples, the training model may include multiple layers (e.g., neural network layers, learning layers, training layers, trained layers). For example, the training model may include a set of beginning layers which are identical or near identical (e.g., identical or near identical based on features, edges, or curves associated with detecting objects or the target object 330 in an image). In some examples, the training model may include a last layer(s) for distinguishing the target object (e.g., a fully connected (FC) layer). In some examples, an output from the FC layer may include a single class or a probability of classes describing an image including the target object 330. In some examples, the single class or a probability of classes may describe the target object 330 and other objects included in the image.

In some examples, the training model (e.g., the trained model) may include a set of learning layers for distinguishing the target object 330 from other objects included in images captured by the other devices 115 (e.g., the device 115-*b*, the device 115-*c*). In some examples, the training model may include class information associated with each of the learning layers, name associated with each of the learning layers, version associated with each of the learning layers, or a combination thereof.

The training model (e.g., trained model) may include a set of learning models. In some examples, the learning models may include a set of learning functions associated with detecting the target object 330, detecting features of the target object 330 (e.g., hair color, hair length, or height, in the example of a child; color, size, or device type in the example of a mobile device), or both. In some examples, the learning models may include a set of learning functions associated with detecting additional objects (e.g., a hat, pants, or a jacket in the example of a child; a "Green Day" sticker in the example of a mobile device), detecting features of the additional objects, or differentiating between the target object 330 and the additional objects.

According to examples of aspects described herein, the training model may be trained (e.g., periodically) based on images captured by the devices 115 (e.g., the device 115-*a*). For example, the device 115-*a* may identify, from images captured by the device 115-*a*, objects having a common association with the target object 330 (e.g., objects which appear in captured images including the target object 330 a number of times equal to or greater than a threshold number). In some examples, the device 115-*a* may use triplet loss to differentiate between common objects, for example, using object detection frameworks (e.g., SSDlite) or machine learning platforms (e.g., TensorFlow). Based on the differentiation, the device 115-*a* may train the training model to determine or detect objects having a common association with the target object 330. In some examples, the device 115-*a* may train the training model based on response messages 310 received from other devices 115 (e.g., the device 115-*b*, the device 115-*c*).

In another example aspect, the training model (e.g., the trained model) may include a relationship between the target object 330 and an additional object with respect to the target object 330. In some examples, the portion of the trained model associated with the target object 330 may include a relationship between the target object 330 and at least one additional object with respect to the target object 330. In some examples, the device 115-*a* may transmit the request message 305 based on the relationship, a weighting factor associated with the relationship, or both. In aspects, the device 115-*a* may receive a response message 310 based on the request message 305 (e.g., based on the relationship, the weighting factor associated with the relationship, or both).

In some examples, the relationship between the target object 330 and the additional object with respect to the target object 330 may include correlation information with respect to the target object 330 and the additional object. In some examples, the correlation information may include a frequency in which the target object 330 and the additional object appear in the same image or images prior to the target object 330 being lost (e.g., prior to the device 115-*a* no longer detecting the target object 330, prior to the device 115-*a* indicating the target object 330 as a lost object via the request message 305). In some examples, the device 115-*a* may apply a weighting factor to the correlation information.

In some examples, based on the correlation information, the devices 115 receiving the request message 305 (e.g., the device 115-*b*, the device 115-*c*) may perform operations for detecting the additional object. For example, the devices 115 (e.g., device 115-*b*, device 115-*c*) may detect for the additional object within one or more micro search areas. In some examples, the micro search areas may be included in the target area 420 or different from (e.g., outside) the target area 420.

In the example where the target object 330 is a child, the device 115-*a* may train the training model (e.g., the trained model) based on articles of clothing (e.g., a hat, pants, and a jacket) associated with the child. For example, the device 115-*a* may train the training model based on an image captured by the device 115-*a* in which the child is wearing one or more of the articles of clothing. The device 115-*a* may train the training model based on a temporal instance when the device 115-*a* detected the child and the articles of clothing (e.g., based on a temporal instance when the device 115-*a* captured the image).

In some examples, the training model (e.g., the trained model) may include a relationship between the target object 330 and the articles of clothing. In some examples, the training model (e.g., the trained model) may apply respective weighting factors to the hat, the pants, and the jacket. In some examples, the trained model may apply a higher weighting factor to the pants compared to the hat and jacket, for example, based on a fluidity factor (e.g., the hat and the jacket are less likely to be removed by the child compared to the pants). In some examples, where the target object 330 is a child, the training model (e.g., the trained model) may apply relatively higher weighting factors to features which may remain relatively constant (e.g., height, skin tone) compared to features that may be changed (e.g., long hair which may be worn up or down).

In the example where the target object 330 is a mobile device (e.g., a laptop computer, a tablet computer), the device 115-*a* may train the training model (e.g., the trained model) based objects associated with the mobile device. For example, the device 115-*a* may train the training model based on an image captured by the device 115-*a* in which an object (e.g., a sticker, for example, a sticker associated with the band "Green Day") was attached to the mobile device. The device 115-*a* may train the training model based on a temporal instance when the device 115-*a* detected the mobile device and the object (e.g., based on a temporal instance when the device 115-*a* captured the image). In some examples, the trained model may apply a relatively high weighting factor to the sticker, for example, based on a fluidity factor (e.g., the sticker is an object having a relatively high probability of remaining attached to the laptop computer, the training model may differentiate between laptop computers having similar physical characteristics based on the sticker).

The device 115-*a* may determine the target area associated with the target object 330, based on location information associated with the device 115-*a*, location information associated with the target object 330, or both. For example, the device 115-*a* may determine the target area based on a location or area where the device 115-*a* most recently detected the target object 330. The device 115-*a* may determine or set a size of the target area based on, for example, a mobility of the target object 330, a venue associated with the target object 330 (e.g., a venue where the target object 330 was lost), or both. In an example, the device 115-*a* may set the target area to a relatively smaller size for a non-moving or stationary object (e.g., a set of house keys). In some examples, the device 115-*a* may set the target area to a relatively larger size for a moving object (e.g., a child). Some examples of a venue may include a shopping mall, an airport, an office building, a conference hall, a sports arena such as a football stadium, or the like.

In some examples, where the target object 330 is a non-moving object or stationary object (e.g., the set of house keys) which was lost in an airport having a lost-and-found department, the device 115-*a* may increase or expand the size of the target area to include the location of the lost-and-found department. In another example aspect, where the target object 330 is a moving object (e.g., a child), the device 115-*a* may continuously or periodically increase or expand the size of the target area until the target object 330 has been located. For example, the device 115-*a* may continuously or periodically increase or expand the size of the target area based on movement speed of the child, variables associated with movement speed of the child (e.g., the child may have been kidnapped and taken in a vehicle), venue size, or a combination thereof. In another example aspect, where the target object 330 is an object (e.g., a backpack) transported or worn by a moving object (e.g., a person, a child) collocated with the target object 330, the device 115-*a* may continuously or periodically increase or expand the size of the target area based on movement speed of the moving object (e.g., the person, the child), variables associated with movement speed of the moving object (e.g., walking speed, running speed), the venue size, or a combination thereof.

The device 115-*a* may transmit the request message 305 to other devices 115 (e.g., the device 115-*b*, the device 115-*c*) based on location information associated with the target area. For example, the device 115-*a* may transmit the request message 305 to the other devices 115 based on position information of the other devices 115 with respect to the target area. In some examples, the device 115-*a* may transmit the request message 305 (e.g., including images, trained models, etc.) to devices 115 located in or within a threshold distance from the target area. In some examples, the device 115-*a* may broadcast or unicast the request message 305 (e.g., including images, trained models, etc.) to devices 115 that were previously located in or within a threshold distance from the target area where the device 115-*a* most recently detected the target object 330. In some aspects, the device 115-*a* may broadcast the request message 305 to the devices 115 via using a D2D protocol (e.g., LTE-V2X, PC5 interface) or a P2P interface. In some other aspects, the device 115-*a* may unicast the request message 305 to the devices 115 via a Uu interface (e.g., LTE Uu, NR Uu).

In some examples, where the target object 330 is a child, the device 115-*a* may determine the target area based on a location (e.g., a geotag, a geolocation) associated with an image including the child. In some examples, the device 115-*a* may determine the target area based on a temporal instance or a temporal period associated with the image (e.g., a temporal instance when the image was captured by the device 115-*a*, a temporal period during which the image was captured by the device 115-*a*). In some examples, where the target object 330 is a mobile device (e.g., a laptop computer, a tablet computer), the device 115-*a* may determine the target area based on a location (e.g., a geotag, a geolocation) associated with an image including the mobile device. In some examples, the device 115-*a* may determine the target area based on a temporal instance associated with the image (e.g., a temporal instance when the image was captured by the device 115-*a*) or a temporal period associated with the image (e.g., a temporal period during which the image was captured by the device 115-*a*). In some other example aspects, where the target object 330 is a mobile device, the device 115-*a* may determine the target area based on a location (e.g., global positioning satellite (GPS) coordinates of the device 115-*a*) associated with a temporal instance when the device 115-*a* was most recently connected (e.g., via a wireless connection, for example, a Bluetooth connection) to the mobile device. In some examples, the device 115-*a* may determine the target area based on a location (e.g., GPS coordinates of the device 115-*a*) associated with a temporal duration during which the device 115-*a* was connected (e.g., via a wireless connection, for example, a Bluetooth connection) to the mobile device.

In some examples, the request message 305 may include the target area associated with the target object 330. For example, the request message 305 may include a location where the target object 330 was last detected by the device 115-*a* (e.g., a location associated with the device 115-*a* or the target object 330 when the device 115-*a* captured an image including the target object 330). The location may include, for example, coordinates or a geolocation. In some examples, the target area may include, for example, a relative location (e.g., an area or region including the location). In some examples, the request message 305 may include a temporal instance when the target object 330 was detected (e.g., last detected) by the device 115-*a*. For example, the request message 305 may include a temporal instance when the device 115-*a* captured an image including the target object 330.

In some examples, the request message 305 may include directional information associated with the target object 330. In an example, the directional information may include a direction the target object 330 was traveling when detected (e.g., last detected) by the device 115-*a*. For example, the directional information may include a direction the target object 330 was traveling when the device 115-*a* captured an image including the target object 330. In some examples, the directional information may include a pose (e.g., directionality, orientation) of the target object 330 when the device 115-*a* captured an image including the target object 330.

The device 115 may receive response messages 310 from the other devices 115 (e.g., device 115-*b*, device 115-*c*). The response message 310 may include images captured by the other devices 115. In some examples, the response messages 310 may include images of the target object 330, images of objects associated with the target object 330, or both. In some examples, a response message 310 may include a portion of an image including the target object 330. In some examples, a response message 310 may include a portion of an image including an object associated with the target object 330 (e.g., a portion of an image including a hat worn by a child, a portion of an image including a "Green Day" sticker attached to a laptop computer). In some examples, the device 115-*a* may receive the response messages 310 via a communications link 315. The communications link 315 may include examples of aspects of the communications links 135 described herein with respect to FIG. 1. In some examples, a device 115 (e.g., device 115-*b*, device 115-*c*) which detects the target object 330 may transmit a response message 310 including a single image captured at a temporal instance or multiple images captured over a temporal period.

In some examples, the other devices 115 (e.g., device 115-*b*, device 115-*c*) may buffer images (e.g., video images) for a temporal period less than or equal to a configured duration (e.g., 10 minutes). In an example, the device 115-*b* may use the training model (e.g., the trained model) received in the request message 305 to detect the target object 330 based on images captured during the temporal period. For example, the device 115-*b* may apply (e.g., run) the training model against images included within the 10 minutes of buffered images captured by the device 115-*b* and real-time images being captured by the device 115-*b*. Aspects of the techniques described herein may minimize storage overhead on the devices 115. For example, the device 115-*b* may apply a general object detection framework (e.g., SSDlite) for detecting objects in the buffered images. In some examples, the device 115-*b* may store the detected objects, class information associated with the detected objects, location information associated with the detected objects, pose associated with the detected objects, or any combination thereof (e.g., without storing the buffered images).

In some examples, the image including the target object 330 (or the portion of the image including the target object 330) may include bounding boxes associated with the target object 330, bounding boxes associated with features of the target object 330, or both. In some examples, the image including the target object 330 (or the portion of the image including the target object 330) may include bounding boxes associated with an object associated with the target object 330, bounding boxes associated with features of the object associated with the target object 330, or both. In some examples, the response message 310 may include a set of confidence scores corresponding to the bounding boxes (e.g., bounding boxes associated with the target object 330, bounding boxes associated with features of the target object 330, bounding boxes associated with an object associated with the target object 330, bounding boxes associated with features of the object associated with the target object 330).

In some examples, the confidence scores may be based on the training model (e.g., trained model) associated with the target object 330. For example, the target object 330 and the confidence scores may be based on a combination of filters and model associations (e.g., sub-models). The combination of filters and model associations (e.g., sub-models) may correspond to the target object 330, features of the target object 330, or objects associated with the target object 330.

In some examples, a device 115 (e.g., the device 115-*b*) may detect multiple candidate objects and objects associated with the candidate objects (e.g., based on the request message 305 transmitted by the device 115-*a* in association with the target object 330). In an example, the device 115-*b* may determine (e.g., assign) confidence scores associated with the candidate objects based on features of the candidate objects, the objects associated with the candidate objects, or both. The device 115-*b* may determine (e.g., assign) initial confidence scores based on a primary feature associated with the target object 330. In some examples, the device 115-*b* may refine or modify the initial confidence scores based on a secondary feature associated with the target object 330. The device 115-*b* may refine or modify the initial confidence scores using, for example, a refined search or cascaded search. In some examples, the machine learning component 325-*b* may perform a refined search or cascaded search based on the training model (e.g., trained model) included in the request message 305.

In an example where the target object 330 is a child having a height of 3 feet and wearing a blue shirt, the device 115-*b* may capture an image which includes multiple candidate objects (e.g., multiple children, articles of clothing the children are wearing). In some examples, the device 115-*b* may capture multiple images which include candidate objects. The image (or images) may include, for example, a first child, a second child, a third child, and articles of clothing the first child through the third child are wearing.

The device 115-*b* may determine (e.g., assign) confidence scores to bounding boxes corresponding to the first child through the third child, for example, based on features of the children (e.g., height) and articles of clothing respectively worn by the children.

For example, in the image captured by the device 115-*b*, the device 115-*b* may detect the first child is 2 feet, 11 inches tall and wearing a blue shirt, detect the second child is 3 feet, 1 inch tall and wearing a green shirt, and detect the third child is 3 feet, 6 inches tall and wearing a black dress. In some examples, the device 115-*b* may determine (e.g., assign) initial confidence scores based on a primary feature, for example, height. For example, the device 115-*b* may assign relatively higher confidence scores to the first child and second child compared to the third child, based on height or the type of clothing worn by the children. In some examples, the device 115-*b* may refine or modify the confidence scores based on a secondary feature, for example, the article of clothing the child is wearing. For example, the device 115-*b* may increase the confidence score assigned to the first child based on shirt color (e.g., the first child is wearing a blue shirt).

In some aspects, the device 115-*a* may determine a change of state with respect to the target object 330 based on the response messages 310. For example, the target object 330 may be a child having a height of 3 feet and wearing a blue shirt and grey sneakers, and the device 115-*b* may capture an image of a child having a height of 3 feet and wearing grey sneakers, but a red shirt. The device 115-*b* may determine (e.g., assign) a relatively high confidence score to the child in the captured image based on the matching height (e.g., 3 feet) and the matching sneakers (e.g., the grey sneakers). The device 115-*b* may include, in the response message 310, an indication of a change of state with respect to the target object 330 (e.g., using the confidence score, a state change indicator, or both). In some aspects, the device 115-*b* may include, in the response message 310, the confidence score assigned to the child. Based on the response message 310 (e.g., based on the confidence score), the device 115-*a* may determine a change of state with respect to the target object 330 (e.g., based on the confidence score satisfying a threshold, based on the state change indicator, or both).

In an example where the target object 330 is a black laptop computer having a visible brand logo and an object (e.g., a "Green Day" sticker) attached to the laptop computer, the device 115-*b* may capture an image or multiple images which include candidate objects (e.g., laptop computers). The image (or images) may include, for example, a first laptop computer, a second laptop computer, a third laptop computer, and objects attached to the first through third laptop computers. The device 115-*b* may determine (e.g., assign) confidence scores to bounding boxes corresponding to the first through third laptop computers, for example, based on features of the first through third laptop computers (e.g., color, brand logo if visible) and objects attached to the first through third laptop computers (e.g., stickers, laptop cases, etc.). In some examples, the device 115-*b* may access and search images previously captured and stored (e.g., buffered, stored in a memory) by the device 115-*b*.

For example, in the image captured by the device 115-*b*, the device 115-*b* may detect the first laptop computer is black, detect the second laptop computer is black, and detect the third laptop computer is white. In some examples, the device 115-*b* may determine (e.g., assign) initial confidence scores based on a primary feature, for example, color. For example, the device 115-*b* may assign relatively higher confidence scores to the first laptop computer and second laptop computer compared to the third laptop computer, based on color (e.g., the color black). In some examples, the device 115-b may refine or modify the confidence scores based on a secondary feature, for example, brand logo. For example, the device 115-b may increase the confidence score assigned to the first laptop computer or the second laptop computer based on whether brand logos associated with the first laptop computer or second laptop computer match (e.g., within a threshold) a brand logo associated with the target object 330. In some examples, the device 115-b may refine or modify the confidence scores based on objects attached to the laptop computers. For example, the device 115-b detect a "Green Day" sticker attached to the first laptop computer. In an example, the device 115-b may increase the confidence score assigned to the first laptop computer based on the "Green Day" sticker attached to the first laptop computer.

The response messages 310 may include, for example, location information of the other devices 115 (e.g., coordinates of a device 115 which detected the target object 330 or captured an image including the target object 330). In some examples, the response messages 310 may include a pose of the other devices 115 (e.g., position, orientation, or both of a device 115 when the device 115 detected the target object 330 or captured an image including the target object 330). In some examples, the response messages 310 may include location information of the target object 330 (e.g., estimated coordinates of the target object, an estimated area), a pose of the target object 330 (e.g., position, orientation, or both of the target object), or both as determined by the other device 115 (e.g., the devices 115-b and 115-c).

The response messages 310 may include a temporal information of the target object 330. In some examples, the response messages 310 may include a temporal period of the target object 330 detected within the target area (e.g., a temporal period during which device 115-b or device 115-c detected the target object 330 or captured an image including the target object 330). In some examples, the response messages 310 may include a temporal instance when the device 115-b or device 115-c detected the target object 330 or captured an image including the target object 330.

The response messages 310 may each include a set of confidence scores associated with the devices 115 (e.g., the device 115-b, the device 115-c) which detected the target object 330 or captured an image including the target object 330. For example, a response message 310 from the device 115-b may include a confidence score associated with location information of the device 115-b (e.g., when the device 115-b detected the target object 330 or captured an image of the target object 330). In some examples, the response message 310 from the device 115-b may include a confidence score associated with the pose of the device 115-b with respect to a temporal instance when the device 115-b detected the target object 330 (e.g., captured an image of the target object 330). In some examples, the response message 310 from the device 115-b may include a confidence score associated with the temporal information of the target object 330. For example, the confidence score may be associated with a temporal instance or a temporal period when the device 115-b detected the target object 330 (e.g., captured an image of the target object 330).

In some examples, the response messages 310 may include descriptive captioning associated with the target object 330. In some aspects, the descriptive captioning may include metadata (e.g., keywords associated with a captured image of the target object 330, captions, titles, comments, or the like). In some examples, the response messages 310 may include heading information associated with the target object 330. The heading information may be included with or separate from the descriptive captioning. In some examples, the heading information may include a name or heading associated with the target object 330. For example, where the target object 330 is a child, the heading information may include the name of the child. In some aspects, the heading information may include an indicator "child". In some aspects, the response messages 310 may include the descriptive captioning or the heading information associated with the target object 330, without including a captured image (or a portion of the captured image) of the target object 330.

The device 115 may determine positional information with respect to the target object 330 based on the response messages 310. In some examples, the positional information may include a direction, a distance, or a route to the location of the target object 330. In some examples, the device 115 may output (e.g., display) a representation of the direction, the distance, the route, or a portion of an image(s) included in the response messages 310. In some examples, the device 115 may determine a trail to the target object 330 (e.g., a "breadcrumb trail"). The trail to the target object 330 may include, for example, a series of indications (e.g., chronological indications) associated with detecting the target object 330. In some examples, the device 115 may transmit additional request messages 305 (e.g., iteratively or non-iteratively) based on the determined trail. Example aspects of the trail and the additional request messages 305 are described herein with respect to FIG. 4.

In some examples, the device 115-a may display an augmented reality layer (e.g., augmented reality overlay) including the positional information. For example, the device 115-a may display (e.g., on a display screen of the device 115-a) an augmented reality layer in combination with a real-time video image captured by the camera 320-a. In some examples, the device 115-a may be a pair of augmented reality glasses, and the device 115-a may display or overlay an augmented reality layer over the lenses of the of augmented reality glasses. In some examples, the device 115-a may display an estimated distance from the target object (e.g., "the object is within 20 feet"), a direction in which the target object is located (e.g., via an arrow, or an indicator, for example "North"), without or in combination with displaying the augmented reality layer.

In some examples, the devices 115-b and 115-c may include stationary video devices (e.g., CCTV cameras, IoT cameras, IP cameras, security cameras) at a venue. The devices 115-b and 115-c may continuously or periodically capture images and store the images to a server. In an example, the device 115-a may transmit a permission request to the server (or a fee-based service on the server), where the permission request is associated with locating the target object 330. In some examples, the server (or fee-based service) may grant authorization to the device 115-a to transmit request messages 305 to the devices 115-b and 115-c (and receive response messages 310 from the devices 115-b and 115-c) associated with locating the target object 330 as described herein. The server (or fee-based service) may grant authorization to the device 115-a based on a fee (e.g., a one time fee, a subscription fee).

In some examples, the device 115-a may transmit the request message 305 to the server, and the server may perform object tracking and localization operations based on the request message 305 and the images captured by the device 115-b, the device 115-c, or both. The server may send a response message 310 as described herein to the device 115-a. For example, the server may send a response message 310 including a portion of an image including the target object 330 captured by the device 115-b, location information of the device 115-b, a pose of the device 115-b, or temporal information of the target object 330 detected within the target area by the device 115-b.

In some examples, the request message 305 may include a privacy rule associated with the target object 330. The privacy rule may control, for example, identifiable information of the target object 330. For example, the privacy rule may include a jurisdictional rule (e.g. no facial recognition performed in a public space). In some aspects, the privacy rule may include an indication of information to be provided back to the device 115-a by the devices 115 (e.g., the device 115-b or the device 115-c). For example, a privacy rule (or a trained model) in the request message 305 may include an indication for the devices 115 (e.g., the device 115-b or the device 115-c) to provide a captured image of the target object 330 (or a portion of the captured image), a count indicating the number of times the object was detected by the devices 115 (e.g., the device 115-b or the device 115-c) within a temporal period.

In an example, the device 115-a may transmit a request message 305 or receive the response message 310 based on the privacy rule. In an example, the devices 115 (e.g., the device 115-b or the device 115-c) may identify the privacy rule associated with the target object 330. In some examples, the device 115-b or the device 115-c may transmit the response message 310 based on the privacy rule.

In some examples, the device 115-a may configure or set the amount of identifying information that may be shared via the request messages 305 or the response messages 310. For example, where the target object 330 is a lost child, the device 115-a may configure or set (e.g., based on the privacy rule) the amount of identifying information that may be shared via the request messages 305 or the response messages 310 to exclude facial recognition information (e.g., based on a jurisdictional rule). In some examples, based on the privacy rule, a device 115 (e.g., the device 115-b or the device 115-c) may transmit a response message 310 as described herein, but exclude any facial information from images included in the response message 310.

In some examples, the device 115-a may transmit a request message 305 including multiple training models (e.g., a trained models) associated with the target object 330. In some examples, the request message 305 may include portions of the training models. In an example, the request message 305 may include a training model associated with the target object 330 (e.g., a "real" request for detecting children under 10 years old) and additional training models which may be unrelated (e.g., having a lower correlation with respect to a threshold) to the target object 330 (e.g., "dummy" requests, for example, a training model for people wearing red shirts, a training model for people wearing green hats, or the like). In some aspects, by transmitting the request message 305 including a training model associated with the target object 330 (e.g., the "real" request) and the additional training models (e.g., the "dummy" requests), the device 115-a may hide or mask the actual target object 330 (e.g., what the device 115-a is looking for). In an example, the device 115-a may receive response messages 310 including images that were captured by the devices 115 (e.g., the device 115-b or the device 115-c) based on the multiple training models. The device 115-a may, for example, run the training model associated with the target object 330 (e.g., the "real" request for detecting children under 10 years old, where the training model may include images of the target object 330) against the images that were captured by the devices 115 (e.g., the device 115-b or the device 115-c) based on the training model (e.g., the "real" request). The device 115-a may ignore images that were captured by the devices 115 based on the additional training models (e.g., the "dummy" requests).

In some examples, the request messages 305 may include descriptive captioning, heading information, or both associated with the target object 330 as described herein. The descriptive captioning may include metadata (e.g., keywords associated with a captured image of the target object 330, captions, titles, comments, or the like). The heading information may include a name or heading associated with the target object 330. In some aspects, the request messages 305 may include the descriptive captioning or the heading information associated with the target object 330, without including a captured image (or a portion of the captured image) of the target object 330. In some aspects, the request messages 305 may include a captioning algorithm having a priori probabilities (e.g., where the target object 330 is a child wearing a red shirt, the prevalence of the color "red" and the type of clothing "shirt" may be increased in the captioning for tracking the target object 330).

The training model may be included in a set of training models included in the machine learning component 150. The training model may include multiple layers (e.g., neural network layers, learning layers, training layers, trained layers). In some examples, the training model may include a set of beginning layers which are identical or near identical (e.g., identical or near identical based on features, edges, or curves associated with detecting objects or a target object in an image). In some examples, the training model may include a last layer(s) for distinguishing the target object (e.g., a fully connected (FC) layer). In some examples, an output from the FC layer may include a single class (e.g., object type, for example, a person, a set of keys) or a probability of classes (e.g., object types) describing an image, a target object in the image, and other objects included in the image). In some examples, the training model may include N classes or N models (where N is an integer). In some examples, the training model may include a hierarchy associated with the N classes (e.g., where the device 115-a indicates the target object 330 is a person, the training model may include classes such as "person", "child", "adult", "male", and "female".

The techniques described herein for multi-device object tracking and localization using the learning models may support computer vision-based recognition and computer vision multi-device tracking systems. In some example aspects, the techniques may support autonomous or semi-autonomous functions related to computer voice-based recognition and computer voice multi-device tracking systems (e.g., separately, or in combination with computer vision-based recognition and computer vision multi-device tracking systems). For example, the request message 305 may include an audio sample associated with the target object 330 (e.g., a voice sample of the target object 330, where the target object 330 is a person, for example, a child). The audio sample of the target object 330 may include, for example, a real-time audio sample captured by the device 115-a (e.g., via a microphone of the device 115-a), an audio sample captured and stored (e.g., buffered) in a memory of the device 115-a, or both. In some examples, the audio sample may include an audio sample of the target object 330 (e.g., voice samples of a child) and an audio sample of an object associated with the target object 330 (e.g., voice samples of a person last seen or detected with the child). In some examples, the request message 305 may include multiple audio samples (e.g., voice samples of the target object 330, voice samples of the object associated with the target object 330, audio samples including voice samples of the target object 330 and voice samples of the object associated with the target object 330).

The device 115-a may receive response messages 310 from the other devices 115 (e.g., device 115-b, device 115-c). The response message 310 may include audio samples captured by the other devices 115 (e.g., via microphones of the other device 115s). In some examples, the response messages 310 may include audio samples (e.g., voice samples) of the target object 330, audio samples (e.g., voice samples) of objects associated with the target object 330, audio samples including voice samples of both the target object 330 and objects associated with the target object 330, or any combination thereof. In some examples, the device 115-a may receive the response messages 310 via a communications link 315. In some examples, a device 115 (e.g., device 115-b, device 115-c) which detects the target object 330 may transmit a response message 310 including an audio sample captured at a temporal instance or multiple audio samples captured over a temporal period.

In some aspects, the techniques described herein for multi-device object tracking and localization using the learning models may support autonomous or semi-autonomous functions related to a combination of computer vision-based recognition and computer vision multi-device tracking systems and computer voice-based recognition and computer voice multi-device tracking systems. The device 115 may determine positional information with respect to the target object 330 based on the response messages 310 as described herein. In some aspects, the response messages 310 may include image information associated with the target object 330 (e.g., a portion of an image including the target object 330, a portion of an image including an object associated with the target object 330), audio information associated with the target object 330 (e.g., audio sample of the target object 330, an audio sample of an object associated with the target object 330), a location of the target object 330 (e.g., a previously seen location 410-a), a pose of the target object 330, or any combination thereof.

Figure 4:
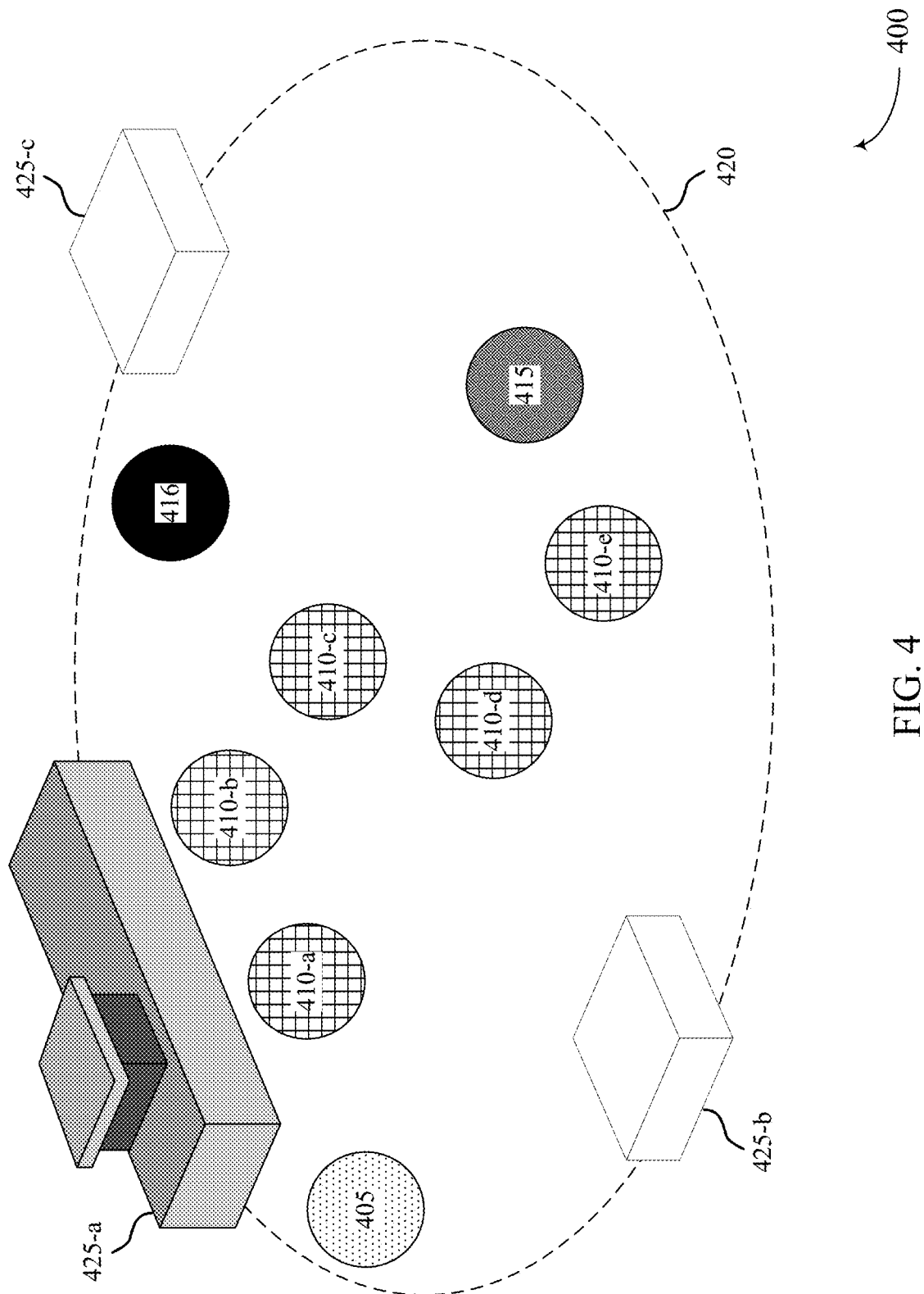
FIG. 4 illustrates an example diagram that supports multi-device object tracking and localization in accordance with aspects of the present disclosure.

FIG. 4 illustrates an example diagram 400 that supports multi-device object tracking and localization in accordance with aspects of the present disclosure. In some examples, the diagram 400 may implement aspects of the systems 100 through 300 as described herein. For example, in the following description of the diagram 400, operations may be performed by devices 115 as described in FIGS. 1 through 3. In some examples, operations in the following description of the diagram 400 may be performed by devices 115 in a different order than the described order, or the operations performed by the devices 115 may be performed in different orders or at different times. Some operations may also be omitted in the following description of the diagram 400, and other operations may be added in the following description of the diagram 400.

The diagram 400 may illustrate a last seen location 405 associated with a target object, one or more previously seen locations 410 of the target object, a current location 415 (e.g., an estimated current location) of the target object, a target area 420, and one or more landmarks 425. In some examples, a device 115-a may transmit a request message associated with a target object to one or more other devices 115 (e.g., a device 115-b, a device 115-c) within the target area 420. The request message may include one or more of an image of the target object, a feature of the target object, or at least a portion of a trained model associated with the target object. In some examples, the request message may include the target area 420 associated with the target object. The target area 420 may be any shape (e.g., a circle, an ellipse, a rectangle, a square, a triangle) and may be configured by the device 115-a, for example, based on a user input or a user preference. The request message may include a location where the target object was last detected by the device 115-a (e.g., the last seen location 405).

The device 115-a may receive response messages from the other devices 115 (e.g., the devices 115-b and the device 115-c). In some examples, the response messages may include images captured by the other devices 115. The response messages may include, for example, a portion of an image including the target object, a portion of an image including an object associated with the target object, or both. In some examples, the response messages may include a location of the target object (e.g., the previously seen location 410) or a pose of the target object. As described herein, the response messages may include, for example, location information of the other devices 115 (e.g., coordinates of a device 115 which detected the target object 330 or captured an image including the target object 330), a pose of the other devices 115 (e.g., position, orientation, or both of a device 115 when the device 115 detected the target object 330 or captured an image including the target object 330), or a combination thereof. For example, the device 115-a may receive response messages respectively indicating previously seen locations 410-a through 410-e.

In some examples, the device 115-a may apply a weighting factor to correlation information with respect to the target object 330 and an additional object as described herein. In some examples, based on the correlation information, the devices 115 receiving the request message 305 (e.g., the device 115-b, the device 115-c) may perform operations for detecting the target object 330 and the additional object. In an example, based on a response message received from the device 115-b, the device 115-a may determine or receive a strong (e.g., satisfying a threshold) correlation from the device 115-b that detected the target object 330 at temporal instance "X" in an area "A". The device 115-a transmit a second request message 305 to other devices in area "A" (e.g., the device 115-c). The second request message 305 may include a perspective threshold associated with a different perspective for detecting the target object 330 (e.g., a different angle or orientation for capturing an image of the target object 330) and a time threshold associated with a different temporal instance for detecting the target object 330 (e.g., temporal instance "X" plus the time threshold). Based on a second response message 310 received from the device 115-c (e.g., in response to the second request message 305), the device 115-a may determine (e.g., with a higher confidence or certainty with respect to a threshold) whether a detected object indicated in the second response message 310 is the target object 330.

The device 115-a may determine (e.g., with the higher confidence or certainty with respect to a threshold) the positional information with respect to the target object 330. For example, the device 115-b (e.g., a camera device) may determine a relatively high correlation (e.g., exceeding a threshold) based on a child's clothes, but may be unable to detect the child's face. The device 115-c (e.g., another camera device) may be located or positioned to capture an image of the child's face (e.g., determine, based on facial recognition, whether the child is the target object 330). Based on the multiple devices 115 (e.g., device 115-b, device 115-c) and the refining of the request messages 305 and the refining of the response messages 310, for example, the device 115-*a* may narrow searches for the target object 330 or obtain additional verification for identifying and determining positional information with respect to the target object 330.

The device 115-*a* may, in some examples, determine positional information with respect to the target object based on the response messages. In some examples, the device 115-*a* may determine a direction, a distance, or a route to the location of the target object based on the response messages (e.g., based on the previously seen locations 410-*a* through 410-*e*). In some examples, the device 115-*a* may output (e.g., display) a representation indicating current and previous positional information associated with the target object. For example, the diagram 400 may include the last seen location 405, the previously seen locations 410-*a* through 410-*e*, and the current location 415 (e.g., estimated current location) of the target object. In some examples, the device 115-*a* may display a current location 416 of the device 115-*a*. The device 115 may also display a set of landmarks 425 associated with the target area 420. For example, the device 115-*a* may display the landmarks 425 based on corresponding landmarks (e.g., buildings, points of interest, etc. for example, corresponding to mapping information) located in the target area 420 or within a threshold distance from the target area 420.

The device 115-*a* may display images associated with the previously seen locations 410-*a* through 410-*e*. In some examples, the device 115-*a* may display the images separately or in combination with displaying a representation of the diagram 400 (e.g., an image). In an example, the device 115-*a* may receive a response message including a portion of an image including the target object, a portion of an image including an object associated with the target object, a location of the target object (e.g., a previously seen location 410-*a*), and a pose of the target object. In some other examples, based on a user input selecting (e.g., via a touch input, a button input, a voice input) the previously seen location 410-*a*, the device 115-*a* may display the portion of the image corresponding to the previously seen location 410-*a*. In an example, the device 115-*a* may display a portion of an image including the target object, where the image was captured by the device 115-*b* at the previously seen location 410-*a*.

The device 115-*a* may output (e.g., display) a representation of a direction or a distance to the target object. In some examples, the device 115-*a* may output (e.g., display on a display screen of the device 115-*a*) an augmented reality layer in combination with a real-time video image captured by the camera 320-*a*. The device 115-*a* may output (e.g., display on the display screen of the device 115-*a*) a map representation indicating the last seen location 405, the previously seen locations 410-*a* through 410-*e*, the current location 415 (e.g., estimated current location) of the target object, and the current location 416 of the device 115-*a*, as illustrated in the diagram 400. The device 115-*a* may output the map representation based on, for example, coordinates of the current location 415 of the target object, coordinates of the last seen location 405, coordinates of the previously seen locations 410-*a* through 410-*e*, coordinates of the current location 415 (e.g., estimated current location) of the target object, and coordinates of the current location 416 of the device 115-*a*.

In some examples, the device 115-*a* may output (e.g., display on the display screen of the device 115-*a*) the map representation described herein, further including a route to the target object. In some examples, the map representation may include landmarks 425-*a* through 425-*c*. In some examples, the device 115-*a* may determine a trail to the target object (e.g., a "breadcrumb trail"), as illustrated by the previously seen locations 410-*a* through 410-*e*. The device 115-*a* may determine and output the map representation and route based on, for example, mapping information (e.g., mapping data) associated with the target area 420, coordinates associated with the current location 415 of the target object, and coordinates associated with the current location 416 of the device 115-*a*.

In some examples, the device 115-*a* may transmit additional request messages (e.g., iteratively or non-iteratively) based on the determined trail. In an example, the device 115-*a* may receive an initial response message including the previously seen location 410-*a*. The device 115-*a* may transmit an additional request message based on the previously seen location 410-*a*. In some examples, the device 115-*a* may receive an additional response messages including, for example, the previously seen location 410-*b*. In some examples, the device 115-*a* may repeat the transmission of additional request messages and receiving additional response messages, for example, up to the previously seen location 410-*e*. Based on the previously seen locations 410-*a* through 410-*e*, the device 115-*a* may determine (e.g., estimate) the current location 415 of the target object.

In some examples, where the target area 420 is associated with a venue, the device 115-*a* may modify the training model (e.g., the trained model), transmit request messages, and determine the positional information with respect to the target object based on, for example, entrance locations, exit locations, or operating hours of the venue. The device 115-*a* may display, on the map representation, icons representing the entrance locations and exit locations. In some examples, where the device 115-*a* is a pair of augmented reality glasses, a user may be wearing the augmented reality glasses at an airport when the user or the augmented reality glasses loses sight of a target object (e.g., a child). The user may rewind and review video footage (e.g., via the augmented reality glasses) until the user views an image including the child. Based on a user input selecting the child in the image, the augmented reality glasses (independently or in conjunction with a co-located or connected device 115, for example, a smartphone) may train a model of the child or fetch a pretrained model of the child (e.g., from a server or database).

The augmented reality glasses or the a co-located or connected device 115 may determine an estimated time range (e.g., a temporal period) since the child was seen based on the image from the video footage, determine a location (e.g., coordinates) associated with the last time the child was seen, estimate how far the child may have traveled with respect to the coordinates since the last time the child was seen, and determine a search range (e.g., search area) for locating the child. The augmented reality glasses (or the co-located or connected device 115) may broadcast an object localization request to all devices 115 within the search range. The devices 115 within the search range may accept the request, apply the trained model against the temporal period, and perform an object detection process as described herein.

Figure 5:
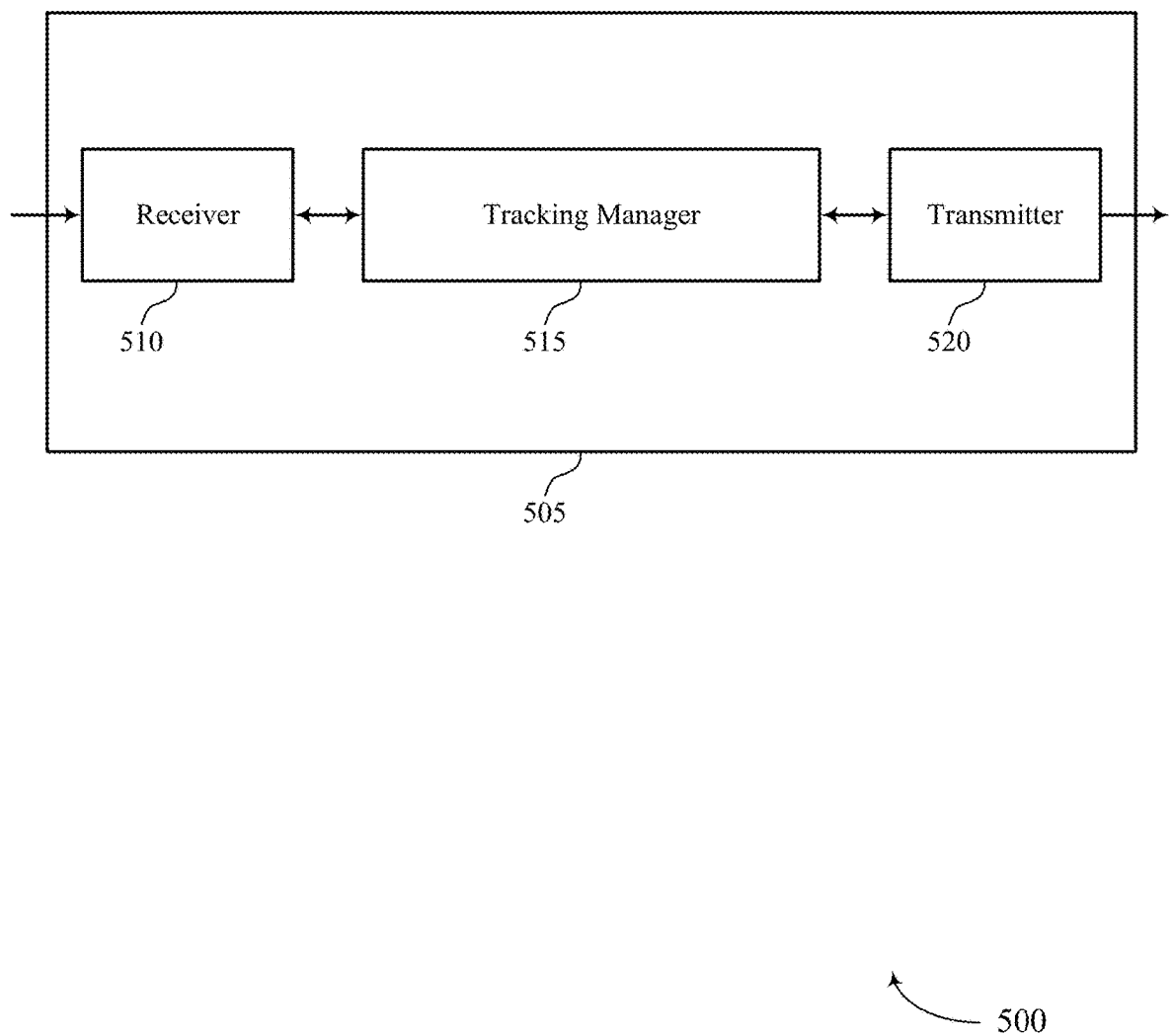
FIGS. 5 and 6 show block diagrams of devices that support multi-device object tracking and localization in accordance with aspects of the present disclosure.

FIG. 5 shows a block diagram 500 of a device 505 that supports multi-device object tracking and localization in accordance with aspects of the present disclosure. The device 505 may be an example of aspects of a device as described herein. The device 505 may include a receiver 510, a tracking manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to multi-device object tracking and localization, etc.). Information may be passed on to other components of the device 505. The receiver 510 may be an example of aspects of the transceiver 820 described with reference to FIG. 8. The receiver 510 may utilize a single antenna or a set of antennas.

The tracking manager 515 may transmit a request message associated with a target object to a set of devices within a target area. The request message may include one or more of an image of the target object, a feature of the target object, or at least a portion of a trained model associated with the target object. The tracking manager 515 may receive one or more response messages from one or more devices of the set of devices based on the request message. The one or more response messages may include one or more of a portion of an image including the target object captured by the one or more devices, location information of the one or more devices, a pose of the one or more devices, or temporal information of the target object detected within the target area by the one or more devices. The tracking manager 515 may determine positional information with respect to the target object based on the one or more response messages, the positional information including one or more of a direction to a location of the target object, a distance to the location of the target object, or a route to the location of the target object. The tracking manager 515 may be an example of aspects of the tracking manager 810 described herein.

The tracking manager 515, or its sub-components, may be implemented in hardware, code (e.g., software or firmware) executed by a processor, or any combination thereof. If implemented in code executed by a processor, the functions of the tracking manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The tracking manager 515, or its sub-components, may be physically located at various positions, including being distributed such that portions of functions are implemented at different physical locations by one or more physical components. In some examples, the tracking manager 515, or its sub-components, may be a separate and distinct component in accordance with various aspects of the present disclosure. In some examples, the tracking manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

Figure 6:
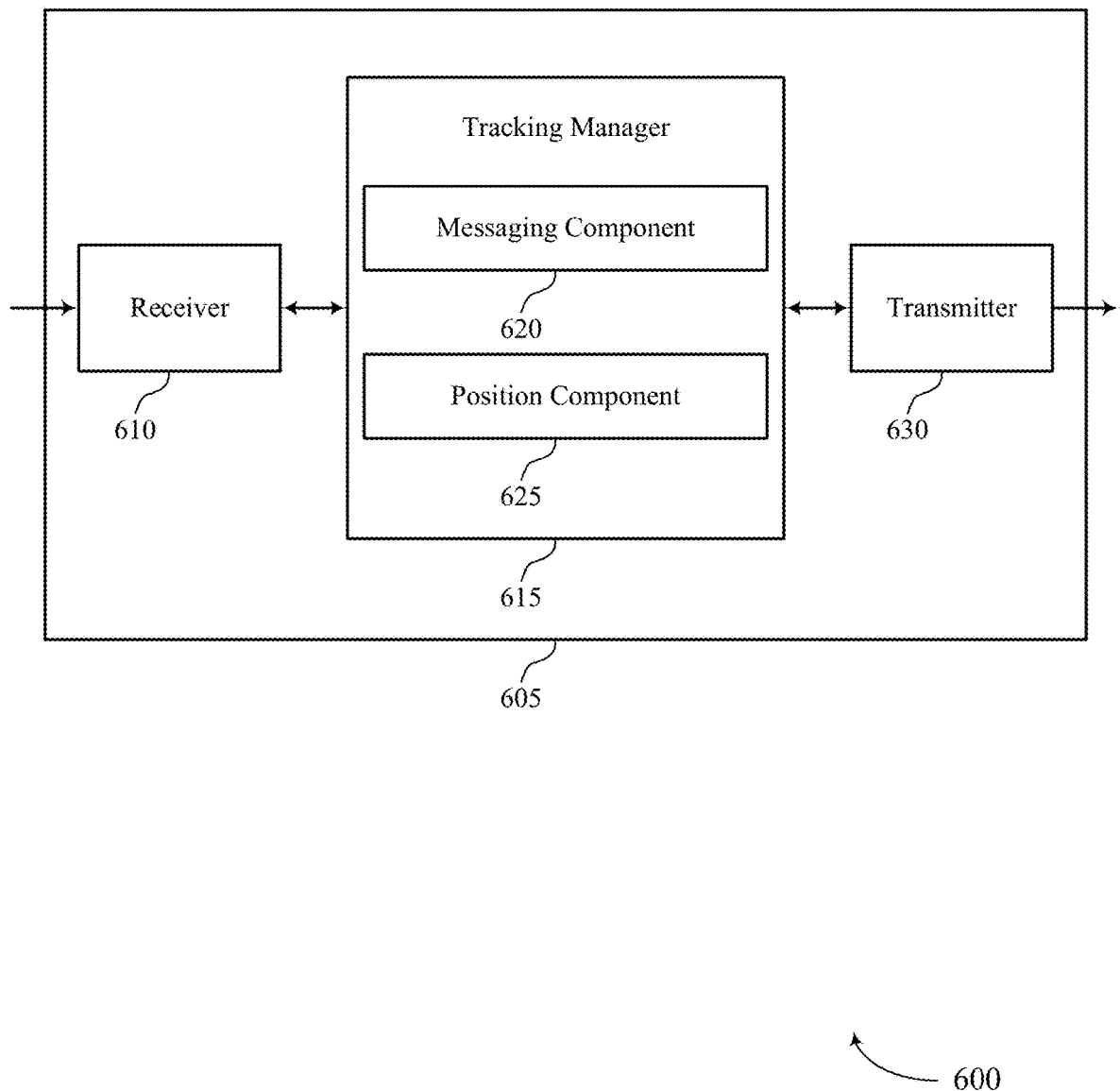

FIG. 6 shows a block diagram 600 of a device 605 that supports multi-device object tracking and localization in accordance with aspects of the present disclosure. The device 605 may be an example of aspects of a device 505 or a device 115 as described herein. The device 605 may include a receiver 610, a tracking manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to multi-device object tracking and localization, etc.). Information may be passed on to other components of the device 605. The receiver 610 may be an example of aspects of the transceiver 820 described with reference to FIG. 8. The receiver 610 may utilize a single antenna or a set of antennas.

The tracking manager 615 may be an example of aspects of the tracking manager 515 as described herein. The tracking manager 615 may include a messaging component 620 and a position component 625. The tracking manager 615 may be an example of aspects of the tracking manager 810 described herein. The messaging component 620 may transmit a request message associated with a target object to a set of devices within a target area. The request message may include one or more of an image of the target object, a feature of the target object, or at least a portion of a trained model associated with the target object. The messaging component 620 may receive one or more response messages from one or more devices of the set of devices based on the request message. The one or more response messages including one or more of a portion of an image including the target object captured by the one or more devices, location information of the one or more devices, a pose of the one or more devices, or temporal information of the target object detected within the target area by the one or more devices. The position component 625 may determine positional information with respect to the target object based on the one or more response messages, the positional information including one or more of a direction to a location of the target object, a distance to the location of the target object, or a route to the location of the target object.

The transmitter 630 may transmit signals generated by other components of the device 605. In some examples, the transmitter 630 may be collocated with a receiver 610 in a transceiver component. For example, the transmitter 630 may be an example of aspects of the transceiver 820 described with reference to FIG. 8. The transmitter 630 may utilize a single antenna or a set of antennas.

Figure 7:
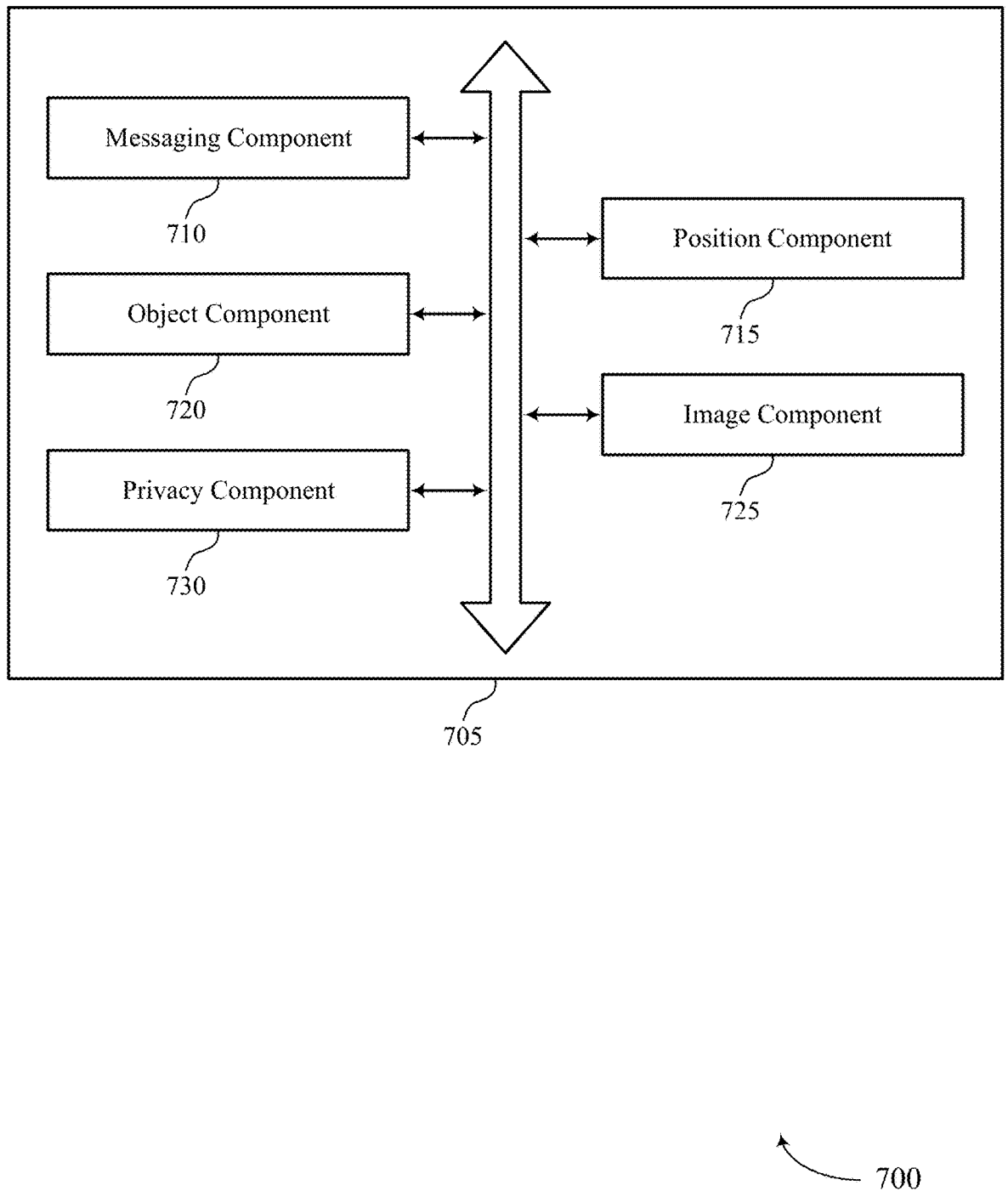
FIG. 7 shows a block diagram of a tracking manager that supports multi-device object tracking and localization in accordance with aspects of the present disclosure.

FIG. 7 shows a block diagram 700 of a tracking manager 705 that supports multi-device object tracking and localization in accordance with aspects of the present disclosure. The tracking manager 705 may be an example of aspects of a tracking manager 515, a tracking manager 615, or a tracking manager 810 described herein. The tracking manager 705 may include a messaging component 710, a position component 715, an object component 720, an image component 725, and a privacy component 730. Each of these components may communicate, directly or indirectly, with one another (e.g., via one or more buses). One or more of these components may be means for supporting multi-device object tracking and localization.

The messaging component 710 may transmit a request message associated with a target object to a set of devices within a target area, the request message including one or more of an image of the target object, a feature of the target object, or at least a portion of a trained model associated with the target object. In some examples, the request message includes one or more of the previous location of the target object, the temporal instance associated with the previous location of the target object, or the previous direction associated with the target object. In some examples, the messaging component 710 may receive one or more response messages from one or more devices of the set of devices based on the request message. The one or more response messages may include one or more of a portion of an image including the target object captured by the one or more devices, location information of the one or more devices, a pose of the one or more devices, or temporal information of the target object detected within the target area by the one or more devices.

In some examples, the one or more response messages are transmitted by the one or more devices of the set of devices based on the verification of the portion of the image including the target object. In some examples, one or more of transmitting the request message or receiving the one or more response messages may be based on the privacy rule associated with the target object. In some cases, each of the one or more response messages include one or more of location information of the target object determined by the one or more devices or a pose of the target object determined by the one or more devices. In some cases, the one or more response messages may include a first response message based on a first subset of learning models of the set of learning models, and a second response message based on a second subset of learning models of the set of learning models, where the second subset of learning models is different from the first subset of learning models.

The messaging component 710 may transmit a second request message associated with the target object to the set of devices within the target area. The messaging component 710 may receive a second response message from the one or more devices of the set of devices based on the request message, the second response message including the portion of the image including the target object. In some examples, the messaging component 710 may receive one or more second response messages from the one or more devices of the set of devices based on the second request message. The one or more second response messages may include one or more of a portion of a second image including the target object captured by the one or more devices, updated location information of the one or more devices, an updated pose of the one or more devices, or updated temporal information of the target object detected within the target area by the one or more devices.

The position component 715 may determine positional information with respect to the target object based on the one or more response messages, the positional information including one or more of a direction to a location of the target object, a distance to the location of the target object, or a route to the location of the target object. In some examples, the position component 715 may estimate the positional information with respect to the target object based on one or more of the one or more response messages, the estimated positional information including one or more of an estimated direction, an estimated distance, or an estimated route to the location of the target object. In some examples, determining the positional information with respect to the target object may be based on the estimated positional information. In some examples, the position component 715 may update the positional information with respect to the target object based on the one or more second response messages. In some examples, the position component 715 may estimate the positional information with respect to the target object based on the one or more second response messages.

The object component 720 may obtain one or more of the image of the target object, the feature of the target object, or at least the portion of the trained model associated with the target object. In some examples, the object component 720 may transmit the request message associated with the target object to the set of devices within the target area based on the obtaining. In some examples, the object component 720 may determine one or more of a previous location of the target object, a temporal instance associated with the previous location of the target object, or a previous direction associated with the target object. In some cases, the temporal information of the target object includes one or more of a temporal period or a temporal instance associated with the one or more devices detecting the target object.

The image component 725 may verify the portion of the image including the target object based on the second response message. In some cases, the portion of the image including the target object includes one or more bounding boxes associated with the target object. In some cases, the image including the target object includes a live image including the target object captured by the one or more devices or a buffered image including the target object and stored by the one or more devices. The privacy component 730 may identify a privacy rule associated with the target object, the privacy rule controlling one or more identifiable information of the target object. In some cases, each of the one or more response messages may include a confidence score associated with one or more of the location information of the one or more devices, the pose of the one or more devices, or the temporal information of the target object.

In some cases, the trained model associated with the target object may include a set of learning layers of the trained model for distinguishing the target object from one or more additional objects in one or more images captured by the one or more devices. In some cases, the trained model associated with the target object may include one or more of class information associated with each of the set of learning layers of the trained model, name associated with each of the set of layers of the trained model, or version associated with each of the set of layers of the trained model. In some cases, the portion of the trained model associated with the target object includes a relationship between the target object and at least one additional object with respect to the target object, and one or more of transmitting the request message or receiving the one or more response messages is based on one or more of the relationship or a weighting factor associated with the relationship. In some cases, the trained model includes a set of learning models, the set of learning models including a set of learning functions associated with one or more of detecting the target object, detecting the feature of the target object, detecting one or more additional objects, detecting features of the one or more additional objects, or differentiating between the target object and the one or more additional objects.

Figure 8:
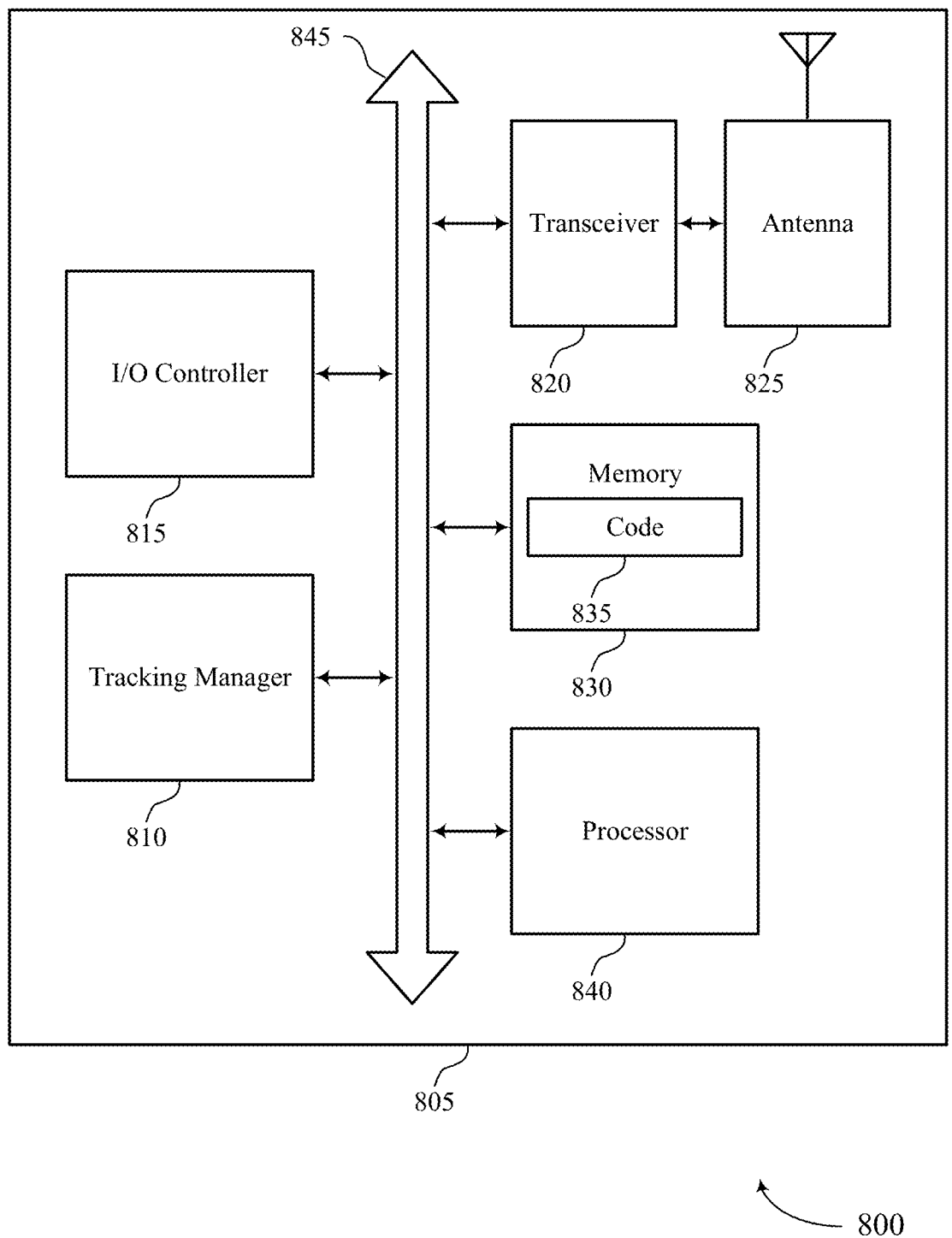
FIG. 8 shows a diagram of a system including a device that supports multi-device object tracking and localization in accordance with aspects of the present disclosure.

FIG. 8 shows a diagram of a system 800 including a device 805 that supports multi-device object tracking and localization in accordance with aspects of the present disclosure. The device 805 may be an example of or include the components of device 505, device 605, or a device as described herein. The device 805 may include components for bi-directional voice and data communications including components for transmitting and receiving communications, including a tracking manager 810, an I/O controller 815, a transceiver 820, an antenna 825, memory 830, and a processor 840. These components may be in electronic communication via one or more buses (e.g., bus 845).

The tracking manager 810 may transmit a request message associated with a target object to a set of devices within a target area. The request message may include one or more of an image of the target object, a feature of the target object, or at least a portion of a trained model associated with the target object. The tracking manager 810 may receive one or more response messages from one or more devices of the set of devices based on the request message. The one or more response messages may include one or more of a portion of an image including the target object captured by the one or more devices, location information of the one or more devices, a pose of the one or more devices, or temporal information of the target object detected within the target area by the one or more devices. The tracking manager 810 may determine positional information with respect to the target object based on the one or more response messages. The positional information may include one or more of a direction to a location of the target object, a distance to the location of the target object, or a route to the location of the target object.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the device 805 may include a single antenna 825. However, in some cases, the device 805 may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The code 835 may include instructions to implement aspects of the present disclosure, including instructions to support object tracking. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting multi-device object tracking and localization).

Figure 9:
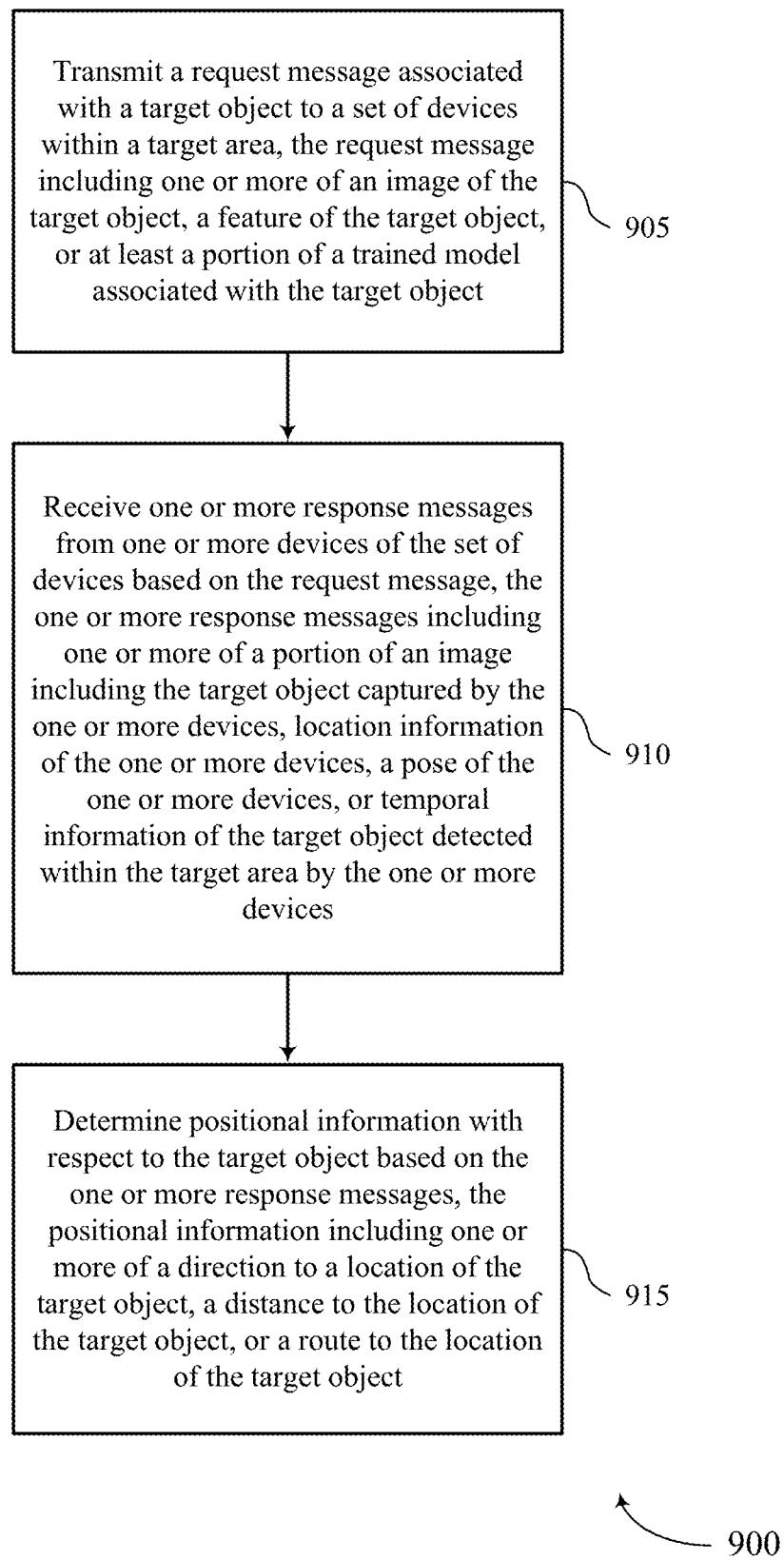
FIGS. 9 through 11 show flowcharts illustrating methods that support multi-device object tracking and localization in accordance with aspects of the present disclosure.

FIG. 9 shows a flowchart illustrating a method 900 that supports multi-device object tracking and localization in accordance with aspects of the present disclosure. The operations of method 900 may be implemented by a device or its components as described herein. For example, the operations of method 900 may be performed by a tracking manager as described with reference to FIGS. 5 through 8. In some examples, a device may execute a set of instructions to control the functional elements of the device to perform the functions described herein. Additionally or alternatively, a device may perform aspects of the functions described herein using special-purpose hardware.

At 905, the device may transmit a request message associated with a target object to a set of devices within a target area, the request message including one or more of an image of the target object, a feature of the target object, or at least a portion of a trained model associated with the target object. The operations of 905 may be performed according to the methods described herein. In some examples, aspects of the operations of 905 may be performed by a messaging component as described with reference to FIGS. 5 through 8.

At 910, the device may receive one or more response messages from one or more devices of the set of devices based on the request message, the one or more response messages including one or more of a portion of an image including the target object captured by the one or more devices, location information of the one or more devices, a pose of the one or more devices, or temporal information of the target object detected within the target area by the one or more devices. The operations of 910 may be performed according to the methods described herein. In some examples, aspects of the operations of 910 may be performed by a messaging component as described with reference to FIGS. 5 through 8.

At 915, the device may determine positional information with respect to the target object based on the one or more response messages, the positional information including one or more of a direction to a location of the target object, a distance to the location of the target object, or a route to the location of the target object. The operations of 915 may be performed according to the methods described herein. In some examples, aspects of the operations of 915 may be performed by a position component as described with reference to FIGS. 5 through 8.

Figure 10:
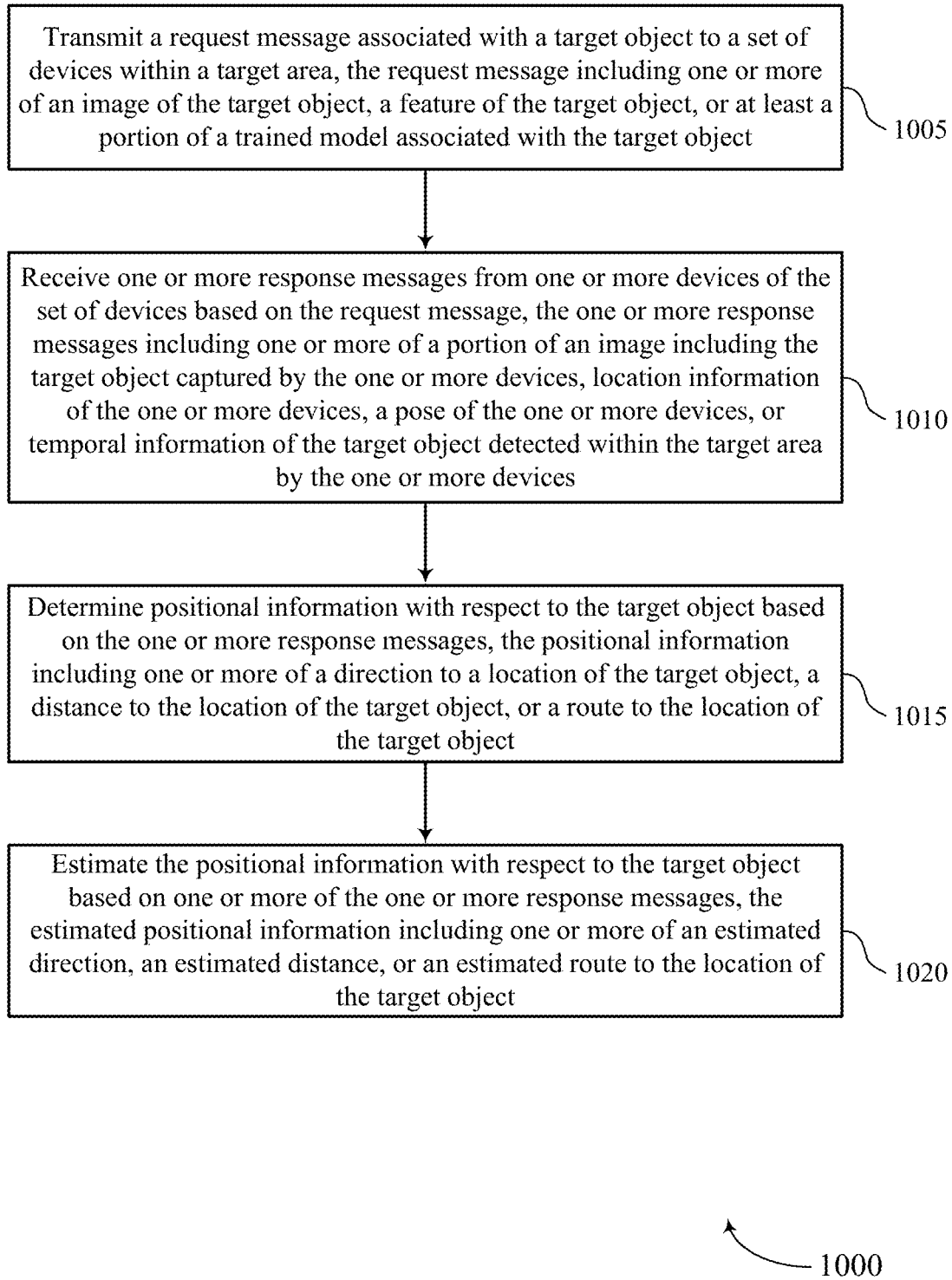

FIG. 10 shows a flowchart illustrating a method 1000 that supports multi-device object tracking and localization in accordance with aspects of the present disclosure. The operations of method 1000 may be implemented by a device or its components as described herein. For example, the operations of method 1000 may be performed by a tracking manager as described with reference to FIGS. 5 through 8. In some examples, a device may execute a set of instructions to control the functional elements of the device to perform the functions described herein. Additionally or alternatively, a device may perform aspects of the functions described herein using special-purpose hardware.

At 1005, the device may transmit a request message associated with a target object to a set of devices within a target area, the request message including one or more of an image of the target object, a feature of the target object, or at least a portion of a trained model associated with the target object. The operations of 1005 may be performed according to the methods described herein. In some examples, aspects of the operations of 1005 may be performed by a messaging component as described with reference to FIGS. 5 through 8.

At 1010, the device may receive one or more response messages from one or more devices of the set of devices based on the request message, the one or more response messages including one or more of a portion of an image including the target object captured by the one or more devices, location information of the one or more devices, a pose of the one or more devices, or temporal information of the target object detected within the target area by the one or more devices. The operations of 1010 may be performed according to the methods described herein. In some examples, aspects of the operations of 1010 may be performed by a messaging component as described with reference to FIGS. 5 through 8.

At 1015, the device may determine positional information with respect to the target object based on the one or more response messages, the positional information including one or more of a direction to a location of the target object, a distance to the location of the target object, or a route to the location of the target object. The operations of 1015 may be performed according to the methods described herein. In some examples, aspects of the operations of 1015 may be performed by a position component as described with reference to FIGS. 5 through 8.

At 1020, the device may estimate the positional information with respect to the target object based on one or more of the one or more response messages, the estimated positional information including one or more of an estimated direction, an estimated distance, or an estimated route to the location of the target object. The operations of 1020 may be performed according to the methods described herein. In some examples, aspects of the operations of 1020 may be performed by a position component as described with reference to FIGS. 5 through 8. In some examples, determining the positional information with respect to the target object may be based on the estimated positional information.

Figure 11:
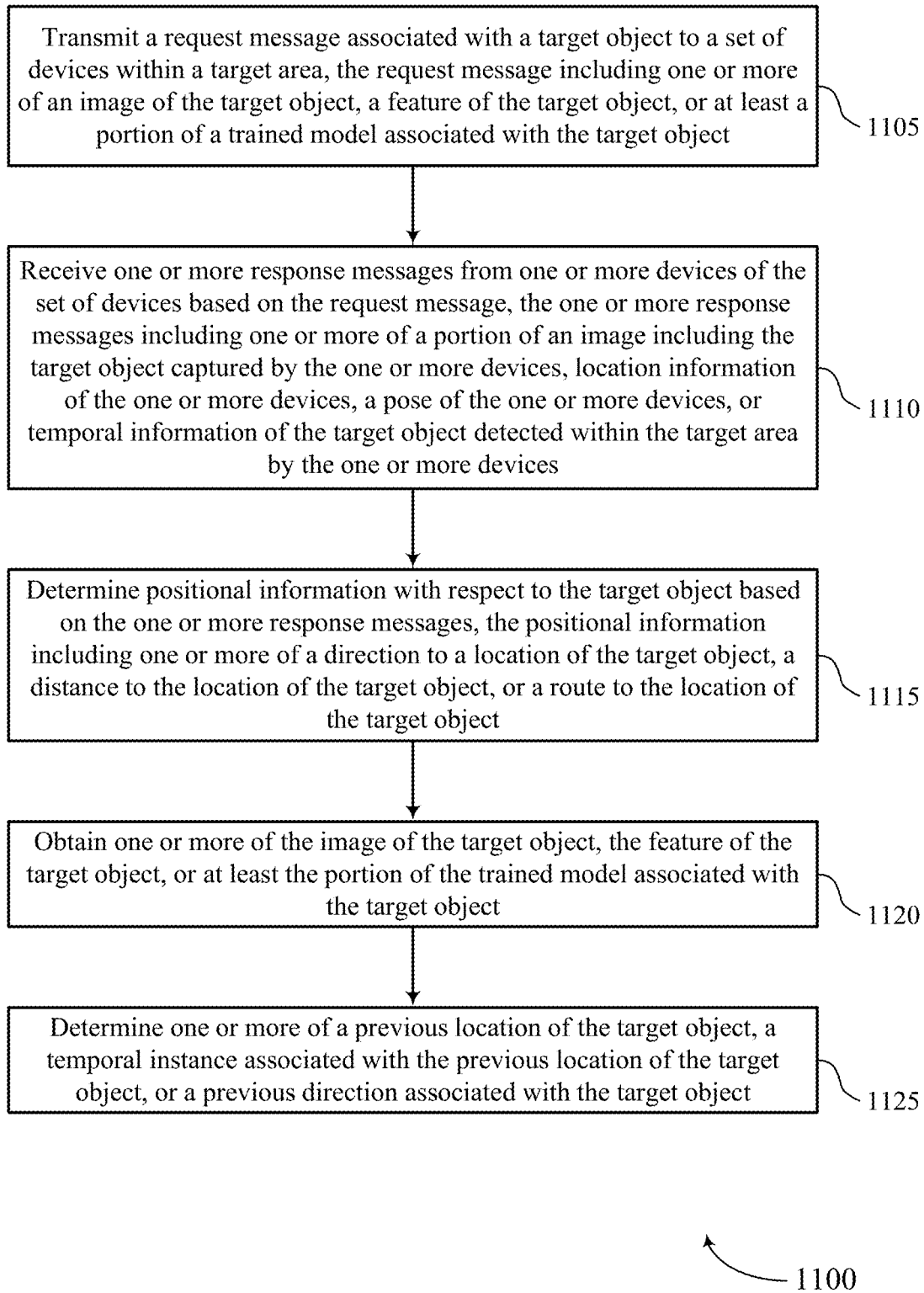

FIG. 11 shows a flowchart illustrating a method 1100 that supports multi-device object tracking and localization in accordance with aspects of the present disclosure. The operations of method 1100 may be implemented by a device or its components as described herein. For example, the operations of method 1100 may be performed by a tracking manager as described with reference to FIGS. 5 through 8. In some examples, a device may execute a set of instructions to control the functional elements of the device to perform the functions described herein. Additionally or alternatively, a device may perform aspects of the functions described herein using special-purpose hardware.

At 1105, the device may transmit a request message associated with a target object to a set of devices within a target area, the request message including one or more of an image of the target object, a feature of the target object, or at least a portion of a trained model associated with the target object. The operations of 1105 may be performed according to the methods described herein. In some examples, aspects of the operations of 1105 may be performed by a messaging component as described with reference to FIGS. 5 through 8.

At 1110, the device may receive one or more response messages from one or more devices of the set of devices based on the request message, the one or more response messages including one or more of a portion of an image including the target object captured by the one or more devices, location information of the one or more devices, a pose of the one or more devices, or temporal information of the target object detected within the target area by the one or more devices. The operations of 1110 may be performed according to the methods described herein. In some examples, aspects of the operations of 1110 may be performed by a messaging component as described with reference to FIGS. 5 through 8.

At 1115, the device may determine positional information with respect to the target object based on the one or more response messages, the positional information including one or more of a direction to a location of the target object, a distance to the location of the target object, or a route to the location of the target object. The operations of 1115 may be performed according to the methods described herein. In some examples, aspects of the operations of 1115 may be performed by a position component as described with reference to FIGS. 5 through 8.

At 1120, the device may obtain one or more of the image of the target object, the feature of the target object, or at least the portion of the trained model associated with the target object. In some examples, transmitting the request message associated with the target object to the set of devices within the target area may be based on the obtaining. The operations of 1120 may be performed according to the methods described herein. In some examples, aspects of the operations of 1120 may be performed by an object component as described with reference to FIGS. 5 through 8.

At 1125, the device may determine one or more of a previous location of the target object, a temporal instance associated with the previous location of the target object, or a previous direction associated with the target object. In some examples, the request message may include one or more of the previous location of the target object, the temporal instance associated with the previous location of the target object, or the previous direction associated with the target object. The operations of 1125 may be performed according to the methods described herein. In some examples, aspects of the operations of 1125 may be performed by an object component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for tracking an object, comprising:
a processor;
memory coupled with the processor; and
a transceiver,
wherein the processor is configured to:
identify a privacy rule associated with a target object, the privacy rule controlling one or more identifiable information of the target object;
transmit, via the transceiver, a request message associated with the target object to a plurality of devices within a target area based at least in part on the privacy rule, the request message comprising one or more of an image of the target object, a feature of the target object, or at least a portion of a trained model associated with the target object;
receive, via the transceiver, one or more response messages from one or more devices of the plurality of devices based at least in part on the request message and the privacy rule, the one or more response messages comprising one or more of a portion of an image including the target object captured by the one or more devices, location information of the one or more devices, a pose of the one or more devices, or temporal information of the target object detected within the target area by the one or more devices; and
determine positional information with respect to the target object based at least in part on the one or more response messages, the positional information comprising one or more of a direction to a location of the target object, a distance to the location of the target object, or a route to the location of the target object.

2. The apparatus of claim 1, wherein the processor is further configured to:
  estimate the positional information with respect to the target object based at least in part on one or more of the one or more response messages, the estimated positional information comprising one or more of an estimated direction, an estimated distance, or an estimated route to the location of the target object, or any combination thereof,
  wherein the processor is configured to determine the positional information with respect to the target object is based at least in part on the estimated positional information.

3. The apparatus of claim 1, wherein the processor is further configured to:
  obtain one or more of the image of the target object, the feature of the target object, or at least the portion of the trained model associated with the target object,
  wherein the processor is configured to transmit the request message associated with the target object to the plurality of devices within the target area is based at least in part on the obtaining.

4. The apparatus of claim 1, wherein the processor is further configured to:
  receive a second response message from the one or more devices of the plurality of devices based at least in part on the request message, the second response message comprising the portion of the image including the target object; and
  verify the portion of the image including the target object based at least in part on the second response message,
  wherein the one or more response messages are transmitted by the one or more devices of the plurality of devices based at least in part on the verification of the portion of the image including the target object.

5. The apparatus of claim 1, wherein each of the one or more response messages comprise a confidence score associated with one or more of the location information of the one or more devices, the pose of the one or more devices, or the temporal information of the target object.

6. The apparatus of claim 1, wherein each of the one or more response messages comprise one or more of location information of the target object determined by the one or more devices or a pose of the target object determined by the one or more devices.

7. The apparatus of claim 1, wherein the processor is further configured to:
  transmit a second request message associated with the target object to the plurality of devices within the target area;
  receive one or more second response messages from the one or more devices of the plurality of devices based at least in part on the second request message, the one or more second response messages comprising one or more of a portion of a second image including the target object captured by the one or more devices, updated location information of the one or more devices, an updated pose of the one or more devices, or updated temporal information of the target object detected within the target area by the one or more devices; and
  update the positional information with respect to the target object based at least in part on the one or more second response messages.

8. The apparatus of claim 7, wherein the processor is further configured to:
  estimate the positional information with respect to the target object based at least in part on the one or more second response messages,
  wherein the processor is configured to determine the positional information with respect to the target object is based at least in part on the estimated positional information.

9. The apparatus of claim 1, wherein the processor is further configured to:
  determine one or more of a previous location of the target object, a temporal instance associated with the previous location of the target object, or a previous direction associated with the target object,
  wherein the request message comprises one or more of the previous location of the target object, the temporal instance associated with the previous location of the target object, or the previous direction associated with the target object.

10. The apparatus of claim 1, wherein the temporal information of the target object comprises one or more of a temporal period or a temporal instance associated with the one or more devices detecting the target object.

11. The apparatus of claim 1, wherein the portion of the image including the target object comprises one or more bounding boxes associated with the target object.

12. The apparatus of claim 1, wherein the image including the target object comprises a live image including the target object captured by the one or more devices or a buffered image including the target object and stored by the one or more devices.

13. The apparatus of claim 1, wherein the trained model associated with the target object comprises:
  a plurality of learning layers of the trained model for distinguishing the target object from one or more additional objects in one or more images captured by the one or more devices; and
  one or more of class information associated with each of the plurality of learning layers of the trained model, name associated with each of the plurality of learning layers of the trained model, or version associated with each of the plurality of learning layers of the trained model.

14. The apparatus of claim 1, wherein the portion of the trained model associated with the target object comprises a relationship between the target object and at least one additional object with respect to the target object, and one or more of transmitting the request message or receiving the one or more response messages is based at least in part on one or more of the relationship or a weighting factor associated with the relationship.

15. The apparatus of claim 1, wherein the trained model comprises a set of learning models, the set of learning models comprising a set of learning functions associated with one or more of detecting the target object, detecting the feature of the target object, detecting one or more additional objects, detecting features of the one or more additional objects, or differentiating between the target object and the one or more additional objects.

16. The apparatus of claim 15, wherein the one or more response messages comprise:
  a first response message based at least in part on a first subset of learning models of the set of learning models; and
  a second response message based at least in part on a second subset of learning models of the set of learning models, wherein the second subset of learning models is different from the first subset of learning models.

17. A method for tracking an object, comprising:

identifying a privacy rule associated with a target object, the privacy rule controlling one or more identifiable information of the target object;

transmitting a request message associated with the target object to a plurality of devices within a target area based at least in part on the privacy rule, the request message comprising one or more of an image of the target object, a feature of the target object, or at least a portion of a trained model associated with the target object;

receiving one or more response messages from one or more devices of the plurality of devices based at least in part on the request message and the privacy rule, the one or more response messages comprising one or more of a portion of an image including the target object captured by the one or more devices, location information of the one or more devices, a pose of the one or more devices, or temporal information of the target object detected within the target area by the one or more devices; and determining positional information with respect to the target object based at least in part on the one or more response messages, the positional information comprising one or more of a direction to a location of the target object, a distance to the location of the target object, or a route to the location of the target object.

18. The method of claim 17, further comprising:

estimating the positional information with respect to the target object based at least in part on one or more of the one or more response messages, the estimated positional information comprising one or more of an estimated direction, an estimated distance, or an estimated route to the location of the target object, wherein determining the positional information with respect to the target object is based at least in part on the estimated positional information.

19. An apparatus for tracking an object, comprising:

means for identifying a privacy rule associated with a target object, the privacy rule controlling one or more identifiable information of the target object;

means for transmitting a request message associated with the target object to a plurality of devices within a target area based at least in part on the privacy rule, the request message comprising one or more of an image of the target object, a feature of the target object, or at least a portion of a trained model associated with the target object;

means for receiving one or more response messages from one or more devices of the plurality of devices based at least in part on the request message and the privacy rule, the one or more response messages comprising one or more of a portion of an image including the target object captured by the one or more devices, location information of the one or more devices, a pose of the one or more devices, or temporal information of the target object detected within the target area by the one or more devices; and means for determining positional information with respect to the target object based at least in part on the one or more response messages, the positional information comprising one or more of a direction to a location of the target object, a distance to the location of the target object, or a route to the location of the target object.

* * * * *